US008377530B2

(12) United States Patent
Peters et al.

(10) Patent No.: US 8,377,530 B2
(45) Date of Patent: Feb. 19, 2013

(54) POLYESTERS WITH LOW MOLECULAR WEIGHT ADDITIVES FOR IMPROVED GAS BARRIER PROPERTIES

(75) Inventors: Richard Dalton Peters, Kingsport, TN (US); Michael Duane Cliffton, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 186 days.

(21) Appl. No.: 13/023,184

(22) Filed: Feb. 8, 2011

(65) Prior Publication Data

US 2012/0199515 A1 Aug. 9, 2012

(51) Int. Cl.
B29D 22/00 (2006.01)
B29D 23/00 (2006.01)
B32B 1/08 (2006.01)

(52) U.S. Cl. ............... 428/35.7; 428/36.9; 428/542.8; 206/524.6; 524/226; 264/540; 264/572; 264/211; 264/320; 264/328.17; 264/299

(58) Field of Classification Search ............. 428/36.9, 428/35.7, 542.8; 206/524.6; 524/226; 264/540, 264/572, 211, 320, 328.17, 299
See application file for complete search history.

(56) References Cited

U.S. PATENT DOCUMENTS

| 4,338,243 | A | 7/1982 | Hecht et al. |
| 4,351,757 | A | 9/1982 | Hoeschele |
| 4,474,918 | A | 10/1984 | Seymour et al. |
| 4,617,374 | A | 10/1986 | Pruett et al. |
| 5,021,515 | A | 6/1991 | Cochran et al. |
| 5,093,466 | A | 3/1992 | Patton et al. |
| 5,114,997 | A | 5/1992 | Golder et al. |
| 5,223,603 | A | 6/1993 | Patton et al. |
| 6,444,283 | B1 | 9/2002 | Turner et al. |
| 6,489,386 | B1 | 12/2002 | Plotzker et al. |
| 7,049,359 | B2 | 5/2006 | Cochran et al. |
| 7,214,415 | B2 | 5/2007 | Tibbitt et al. |
| 7,230,067 | B2 | 6/2007 | Otaki |
| 7,358,324 | B2 | 4/2008 | Chen et al. |
| 7,521,523 | B2 | 4/2009 | Jenkins et al. |
| 7,691,290 | B2 | 4/2010 | Deshpande et al. |

(Continued)

FOREIGN PATENT DOCUMENTS

| EP | 0467368 A2 | 7/1991 |
| JP | 4332724 A | 11/1992 |
| WO | WO 2007/106302 A1 | 9/2007 |
| WO | WO 2008/033765 A2 | 3/2008 |
| WO | WO 2008/095071 A1 | 8/2008 |

OTHER PUBLICATIONS

Poly (ethylene terephthalate) Modified with Aromatic Bisester Diamides: Thermal and Oxygen Barrier Properties: Hibbs et al., Journal of Polymer Science. Part A. Polymer Chemistry 2004, vol. 42, pp. 1668-1681.

(Continued)

*Primary Examiner* — Michael C Miggins
(74) *Attorney, Agent, or Firm* — Jennifer Knight

(57) ABSTRACT

Disclosed is a polyester polymer composition comprising at least one polyethylene terephthalate polyester in an amount ranging from 94.0 weight percent to 99.5 weight percent and at least one additive in an amount ranging from 0.5 weight percent to 6 weight percent, each based on the total weight of the polyester composition. The at least one additive comprises a diamide molecule. The composition of the present invention is useful in producing shaped articles such as, for example, sheeting, films, tubes, bottles, preforms, and profiles. These articles can exhibit improved gas barrier properties. The process for making the polymer composition and the shaped articles is also disclosed.

89 Claims, 2 Drawing Sheets

U.S. PATENT DOCUMENTS

| | | |
|---|---|---|
| 2005/0221036 A1 | 10/2005 | Shi |
| 2006/0180790 A1 | 8/2006 | Deshpande et al. |
| 2006/0199919 A1 | 9/2006 | Hale et al. |
| 2006/0261307 A1 | 11/2006 | Black et al. |
| 2006/0275568 A1 | 12/2006 | Shi et al. |
| 2007/0128389 A1 | 6/2007 | Kezios et al. |
| 2008/0113134 A1 | 5/2008 | Shi et al. |
| 2008/0255280 A1 | 10/2008 | Sims et al. |
| 2008/0277622 A1 | 11/2008 | Deshpande et al. |
| 2009/0061062 A1 | 3/2009 | Beckwith et al. |
| 2010/0273956 A1 | 10/2010 | Jenkins et al. |

OTHER PUBLICATIONS

ASTM D 1003 Method A.
ASTM D 5225-98.
ASTM D3418.
J. Blum, A. Fisher, and E. Greener; "The Catalytic Decomposition of Secondary Carboxamides by Transition Metal Complexes". Tetrahedron. vol. 29, pp. 1073-1081. Pergamon Press 1973.
A. Rahman and M.O. Farooq; Chem. Ber. 86, 945 (1953).
Lee, Jong Suk, et al., "Antiplasticization-based enhancement of poly-(ethylene terephthalate) barrier properties"; Polymer 53 (2012); pp. 213-222.

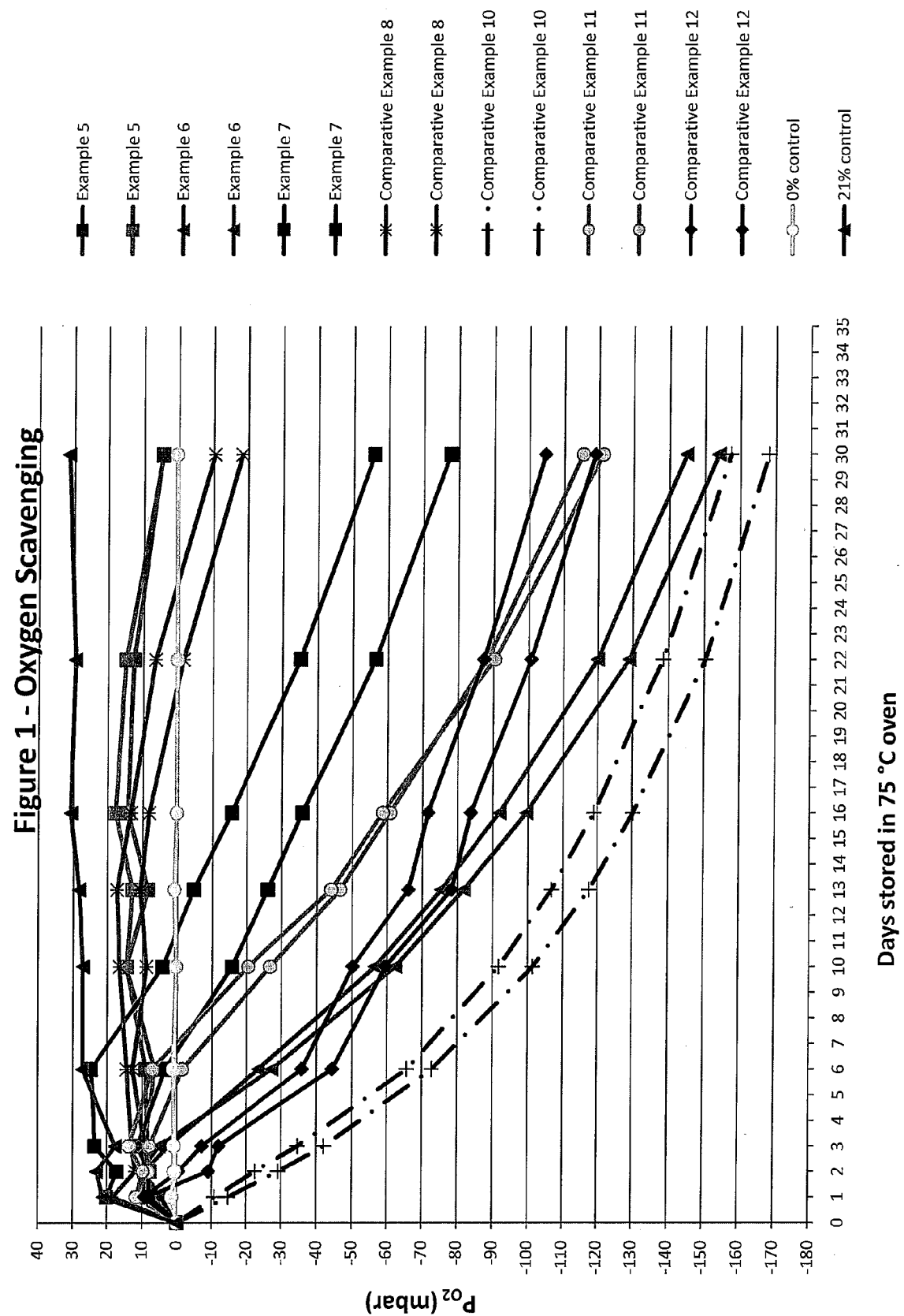

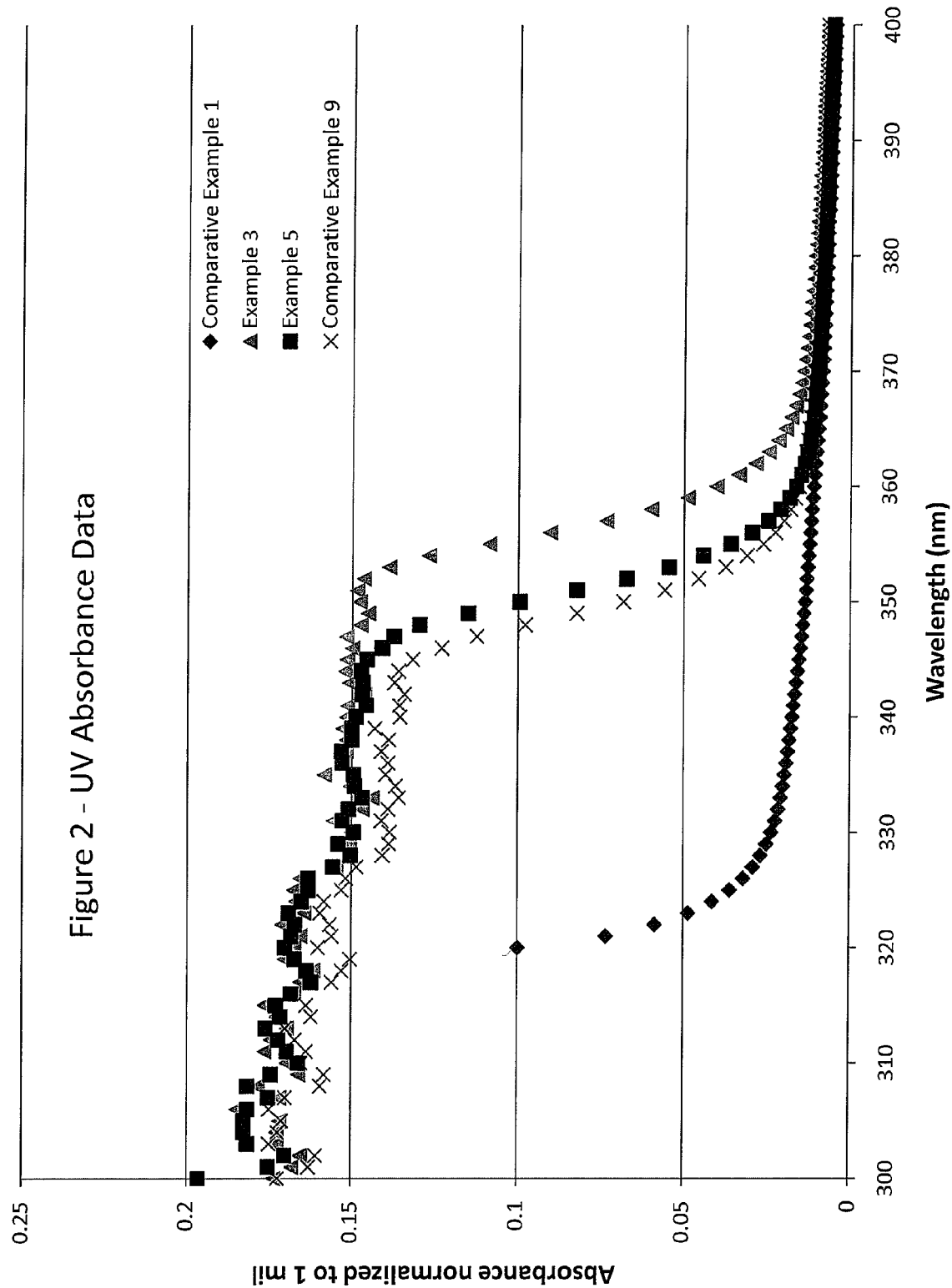

POLYESTERS WITH LOW MOLECULAR WEIGHT ADDITIVES FOR IMPROVED GAS BARRIER PROPERTIES

FIELD OF THE INVENTION

This invention pertains to a polyester composition comprising low molecular weight additives, to methods of making the polyester composition, to articles made from the polyester composition, and to methods of making articles from the polyester composition. The polyester composition exhibits improved passive and/or active gas barrier properties when manufactured into articles such as films, preforms, and bottles.

BACKGROUND OF THE INVENTION

One of the most common thermoplastic polyester polymers is polyethylene terephthalate (PET). PET polymer is used extensively in the packaging industry, especially in the production of bottles for carbonated and non-carbonated beverages. PET is widely used because of its excellent combination of clarity, mechanical, and gas barrier properties. Certain applications, however, require higher gas barrier properties than PET exhibits. These include the need for reduced carbon dioxide egress, particularly for smaller carbonated soft drink containers where the surface to volume ratio is large, and reduced oxygen ingress for oxygen sensitive products such as beer, juice, and tea.

There are several examples of additives or other modifications of PET to improve gas barrier properties. These generally fall into two categories: passive gas barrier technology and active gas barrier technology. The contrast between the two is that passive gas barrier technology provides a physical blockage for the movement of small molecules, such as carbon dioxide or oxygen, across the PET container whereas active gas barrier technology includes such things as oxygen-scavenging where the oxygen molecule is actually consumed in a chemical reaction.

A variety of approaches have been used to enhance the passive barrier properties of PET, including, blends with high barrier polymers or additives that decrease the permeability of the resin, incorporation of impermeable fillers, coated and multilayer structures, and copolymerization with comonomers that produce a lower permeability polymer than unmodified PET. Problems with these technologies include decrease in the PET mechanical properties (e.g., decrease in intrinsic viscosity and/or glass transition temperature with additives) and increased capital and operating costs (e.g., additional equipment to apply coatings and/or expense of multi-layered structures).

There is a need to improve the gas barrier properties of PET without significantly impacting the mechanical properties of the PET or significantly increasing costs.

SUMMARY OF THE INVENTION

We have discovered a polyester polymer composition comprising: at least one polyethylene terephthalate polyester in an amount ranging from 94.0 weight percent to 99.5 weight percent and at least one additive in an amount ranging from 0.5 weight percent to 6.0 weight percent, each based on the total weight of the polyester composition. The at least one additive having the general formula (I) or (II) given below:

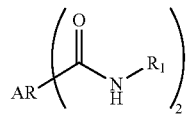

(I)

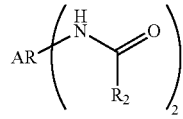

(II)

AR is selected from the group consisting of phenylene ($C_6H_4$) and naphthylene ($C_{10}H_6$). $R_1$ is selected from the group consisting of hydrogen (H), methyl ($CH_3$), ethyl ($CH_2CH_3$), phenyl ($C_6H_5$), and benzyl ($CH_2C_6H_5$). $R_2$ is selected from the group consisting of methyl ($CH_3$), ethyl ($CH_2CH_3$), phenyl ($C_6H_5$), and benzyl ($CH_2C_6H_5$). When AR is phenylene ($C_6H_4$), the substituents, $R_1$ or $R_2$, are located in the meta or para position relative to each other and when AR is naphthylene ($C_{10}H_6$), the substituents, $R_1$ or $R_2$, are located in the 1,3; 1,4; 1,5; 1,6; 1,7; 2,6; or 2,7 position relative to each other.

In another embodiment, we have discovered a polyester polymer composition comprising at least one polyethylene terephthalate polyester in an amount ranging from 94.0 weight percent to 99.5 weight percent and at least one additive in an amount ranging from 0.5 weight percent to 6.0 weight percent, each based on the total weight of the polyester composition. The at least one additive having the general formula (I) given below:

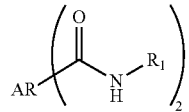

(I)

AR is selected from the group consisting of phenylene ($C_6H_4$) and naphthylene ($C_{10}H_6$). $R_1$ is selected from the group consisting of hydrogen (H), methyl ($CH_3$), ethyl ($CH_2CH_3$), phenyl ($C_6H_5$), and benzyl ($CH_2C_6H_5$). When AR is phenylene ($C_6H_4$), the substituents, $R_1$, are located in the meta or para position relative to each other and when AR is naphthylene ($C_{10}H_6$), the substituents, $R_1$, are located in the 1,3; 1,4; 1,5; 1,6; 1,7; 2,6; or 2,7 position relative to each other.

In another embodiment, we have discovered a polyester polymer composition comprising: at least one polyethylene terephthalate polyester in an amount ranging from 94.0 weight percent to 99.5 weight percent and at least one additive in an amount ranging from 0.5 weight percent to 6.0 weight percent, each based on the total weight of the polyester composition. The at least one additive having the general formula (II) given below:

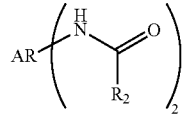

(II)

AR is selected from the group consisting of phenylene (C$_6$H$_4$) and naphthylene (C$_{10}$H$_6$). R$_2$ is selected from the group consisting of methyl (CH$_3$), ethyl (CH$_2$CH$_3$), phenyl (C$_6$H$_5$), and benzyl (CH$_2$C$_6$H$_5$). When AR is phenylene (C$_6$H$_4$), the substituents, R$_2$, are located in the meta or para position relative to each other and when AR is naphthylene (C$_{10}$H$_6$), the substituents, R$_2$, are located in the 1,3; 1,4; 1,5; 1,6; 1,7; 2,6; or 2,7 position relative to each other.

In another embodiment, we have discovered a process for making a polyester polymer composition comprising: feeding at least one polyethylene terephthalate polyester and at least one additive to an extruder, and melt blending the at least one polyethylene terephthalate polyester and the at least one additive to form the polyester composition.

The at least one additive having the general formula (I) or (II) given below:

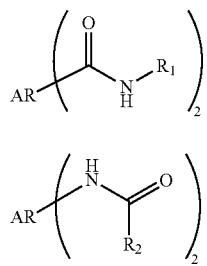

AR is selected from the group consisting of phenylene (C$_6$H$_4$) and naphthylene (C$_{10}$H$_6$). R$_1$ is selected from the group consisting of hydrogen (H), methyl (CH$_3$), ethyl (CH$_2$CH$_3$), phenyl (C$_6$H$_5$), and benzyl (CH$_2$C$_6$H$_5$). R$_2$ is selected from the group consisting of methyl (CH$_3$), ethyl (CH$_2$CH$_3$), phenyl (C$_6$H$_5$), and benzyl (CH$_2$C$_6$H$_5$). When AR is phenylene (C$_6$H$_4$), the substituents, R$_1$ or R$_2$, are located in the meta or para position relative to each other and when AR is naphthylene (C$_{10}$H$_6$), the substituents, R$_1$ or R$_2$, are located in the 1,3; 1,4; 1,5; 1,6; 1,7; 2,6; or 2,7 position relative to each other.

The amount of the at least one polyethylene terephthalate polyester is in the range of 94.0 weight percent to 99.5 weight percent and the amount of the at least one additive is in the range of 0.5 weight percent to 6.0 weight percent of the polyester composition, each based on the total weight of the polyester composition.

In another embodiment, we have discovered an article comprising a polyester polymer composition comprising: at least one polyethylene terephthalate polyester in an amount ranging from 94.0 weight percent to 99.5 weight percent and at least one additive in an amount ranging from 0.5 weight percent to 6.0 weight percent, each based on the total weight of the polyester composition. The at least one additive having the general formula (I) or (II) given below:

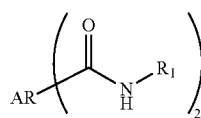

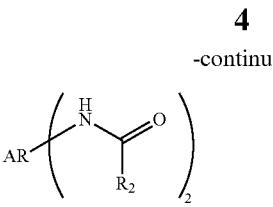

AR is selected from the group consisting of phenylene (C$_6$H$_4$) and naphthylene (C$_{10}$H$_6$). R$_1$ is selected from the group consisting of hydrogen (H), methyl (CH$_3$), ethyl (CH$_2$CH$_3$), phenyl (C$_6$H$_5$), and benzyl (CH$_2$C$_6$H$_5$). R$_2$ is selected from the group consisting of methyl (CH$_3$), ethyl (CH$_2$CH$_3$), phenyl (C$_6$H$_5$), and benzyl (CH$_2$C$_6$H$_5$). When AR is phenylene (C$_6$H$_4$), the substituents, R$_1$ or R$_2$, are located in the meta or para position relative to each other and when AR is naphthylene (C$_{10}$H$_6$), the substituents, R$_1$ or R$_2$, are located in the 1,3; 1,4; 1,5; 1,6; 1,7; 2,6; or 2,7 position relative to each other.

In another embodiment, we have discovered a process for making an article comprising: feeding at least one polyethylene terephthalate polyester and at least one additive to the extruder, melt blending the at least one polyethylene terephthalate polyester and the at least one additive, and forming the article.

The at least one additive having the general formula (I) or (II) given below:

AR is selected from the group consisting of phenylene (C$_6$H$_4$) and naphthylene (C$_{10}$H$_6$). R$_1$ is selected from the group consisting of hydrogen (H), methyl (CH$_3$), ethyl (CH$_2$CH$_3$), phenyl (C$_6$H$_5$), and benzyl (CH$_2$C$_6$H$_5$). R$_2$ is selected from the group consisting of methyl (CH$_3$), ethyl (CH$_2$CH$_3$), phenyl (C$_6$H$_5$), and benzyl (CH$_2$C$_6$H$_5$). When AR is phenylene (C$_6$H$_4$), the substituents, R$_1$ or R$_2$, are located in the meta or para position relative to each other and when AR is naphthylene (C$_{10}$H$_6$), the substituents, R$_1$ or R$_2$, are located in the 1,3; 1,4; 1,5; 1,6; 1,7; 2,6; or 2,7 position relative to each other.

The amount of the at least one polyethylene terephthalate polyester is in the range of 94.0 weight percent to 99.5 weight percent and the amount of the at least one additive is in the range of 0.5 weight percent to 6.0 weight percent of the polyester composition, each based on the total weight of the polyester composition.

BRIEF DESCRIPTION OF THE DRAWINGS

FIG. 1 is a plot of the oxygen partial pressure over time for listed examples and controls.

FIG. 2 is a plot of absorbance normalized to 1 mil thickness over a range of ultra-violet light wavelengths for listed examples.

DETAILED DESCRIPTION

The present invention may be understood more readily by reference to the following detailed description of the invention and the examples provided. It is to be understood that this invention is not limited to the specific processes and conditions described, except when explicitly so stated, because specific processes and process conditions for processing plastic articles may vary. It is further understood that although the various embodiments may achieve one or more advantages, for example reduced carbon dioxide permeability, the claimed invention is not restricted to those advantages, nor need all the advantages be obtained in every instance.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

As used in the specification and the appended claims, the singular forms "a," "an" and "the" include plural referents unless the context clearly dictates otherwise. For example, reference to processing or making a "polymer," "preform," "article," "container," or "bottle" is intended to include the processing or making of a plurality of polymers, preforms, articles, containers or bottles. References to a composition containing or including "an" ingredient or "a" polymer is intended to include other ingredients or other polymers, respectively, in addition to the one named.

It is also to be understood that the mention of one or more method steps does not preclude the presence of additional method steps before or after the combined recited steps or intervening method steps between those steps expressly identified. Moreover, the lettering of process steps or ingredients is a convenient means for identifying discrete activities or ingredients and the recited lettering can be arranged in any sequence, unless otherwise indicated.

The term "percent additive," "weight percent additive" or "% additive" as used herein is defined as the weight percentage of the at least one additive of the invention (i.e., the diamide compound) based on the total weight of the polyester composition.

The term "Intrinsic Viscosity" or "It.V." as used herein is set forth in dL/g units and is calculated from the inherent viscosity (Ih.V.) measured at 25° C. in a 0.50 g polyester/100 mL of 60 wt % phenol and 40 wt % 1,1,2,2-tetrachloroethane as further described in the Examples section. Inherent and intrinsic viscosities are widely used as indirect measurements of molecular weight for polyesters.

The term "glass transition temperature," or "$T_g$" as used herein is the temperature at which the amorphous polyester changes from a brittle vitreous state to a plastic state. The glass transition temperature can be characterized by thermal analysis with a differential scanning calorimeter (DSC).

The color terms, "L*, a*, and b*" as used herein are from the CIE 1976 CIELab color scale. The L* value indicates the transmission/opacity of the sample. The a* value indicates the redness (+)/greenness (−) of the sample. The b* value indicates the yellowness (+)/blueness (−) of the sample.

The term "haze" as used herein refers to the cloudy appearance of a polyester film. Haze is measured using a BYK-Gardner Haze-Gard Plus instrument according to ASTM D 1003 Method A. The instrument performance is verified using haze standards spanning the range of 1% to 30%. Haze results are expressed as percentages.

The term "$CO_2$ permeability" as used herein refers to the tendency of carbon dioxide to pass through a shaped article (e.g., a film).

The term "barrier improvement factor" or "BIF" as used herein is defined as the ratio of the $CO_2$ permeability of the PET resin film without additive divided by the $CO_2$ permeability of the PET resin and additive-containing film.

The term "plate out" as used herein refers to the additives and other materials that can stick to rolls and/or molds when making films or other articles from a polyester and/or a polyester composition.

The term "oxygen scavenging" or "$O_2$ scavenging" as used herein refers to the characteristic of a polyester composition having additives that can readily react with oxygen. This characteristic binds up the oxygen and can keep oxygen for entering packages such as food packages.

The term "polyester", as used herein, is intended to include homopolyesters, copolyesters, and terpolyesters. In general, polyesters are synthetic polymers prepared by the polycondensation of one or more difunctional carboxylic acids with one or more difunctional hydroxyl compounds. Typically, the difunctional carboxylic acid is a dicarboxylic acid or a hydroxycarboxylic acid, and the difunctional hydroxyl compound is a dihydric alcohol such as, for example, glycols and diols. The polyesters of the present invention are polyester thermoplastic polymers and are distinguishable from liquid crystal polymers and thermosetting polymers because they have no appreciable ordered structure while in the liquid (melt) phase, they can be remelted and reshaped into a molded article.

The term "polyethylene terephthalate polyester" as used herein are polyethylene terephthalate homopolymers or copolymers (also described simply as "PET polymers") and are thermoplastic polyester polymers comprising primarily terephthalic acid and ethylene glycol residues.

The term "residue", as used herein in reference to the polyesters of the invention, means any organic structure incorporated into a polyester through a polycondensation involving the corresponding monomer. It will also be understood by persons having ordinary skill in the art, that the residues associated within the polyester, of the invention can be derived from the parent monomer compound itself or any derivative of the parent compound. For example, the dicarboxylic acid may be derived from a dicarboxylic acid or its associated acid halides, esters, salts, anhydrides, or mixtures thereof. Thus, as used herein, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester. The dicarboxylic acid component comprises 100 mole percent of the residues of dicarboxylic acids. The hydroxyl component comprises 100 mole percent of the residues of diols. For example, a polyester may have a dicarboxylic acid component comprising 90 mole percent of the residues of terephthalic acid and 10 mole percent of the residues of isophthalic acid and a hydroxyl component comprising 96 mole percent of the residues of ethylene glycol and 4 mole percent of the residues of diethylene glycol.

The term "position relative to each other" as used herein, refers to the location of substituents on either the phenylene ($C_6H_4$) or napthylene ($C_{10}H_{16}$) section of the at least one additive. For the phenylene substituents, the meta and para positions are well known to those skilled in the art: a common example is meta-xylene and para-xylene. The illustration of naphthalene, given below, explicitly shows the numbering of the carbon atoms used to indicate the relative position of the naphthylene substituents.

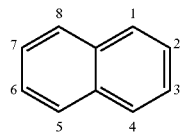

The term "concentrate", as used herein refers to a composition containing a thermoplastic polymer, typically a polyester polymer, and another second ingredient wherein the second ingredient is present at a higher level than intended for the final polyester composition. The term "additive concentrate" refers to a composition containing a thermoplastic polymer and an additive, specifically a diamide compound of the invention. The term "transition metal concentrate" refers to a composition containing a thermoplastic polymer and a transition metal.

The term "transition metal" as used herein is an element selected from the first, second or third transition series of the Periodic Table. The transition metal may be in any oxidative state and may be in the form of a compound such as a salt. The amount of metal present can be measured by X-ray fluorescence (X-Ray) or Inductively Coupled Plasma-Mass Spectrometry (ICP). The reported amounts of metal are given in ppm and are based upon the weight of the polyester composition and measured on the amount of metal, not the metal compound weight as added to the composition. The transition metal can occupy any oxidation state, any morphological state, any structural state, and any chemical state, whether as added to or as present in the polyester composition. Thus, the word "metal" as used throughout does not imply an oxidation state, and a metal may occupy any oxidation state.

The term "ultra-violet absorbance" or "UV absorbance" as used herein refers to the relative amount of ultra-violet light that is absorbed by, as opposed to being transmitted through, the polyester composition or article.

An embodiment is a polyester polymer composition comprising: at least one polyethylene terephthalate polyester in an amount ranging from 94.0 weight percent to 99.5 weight percent and at least one additive in an amount ranging from 0.5 weight percent to 6.0 weight percent, each based on the total weight of the polyester composition. The at least one additive having the general Formula (I) or (II) given below:

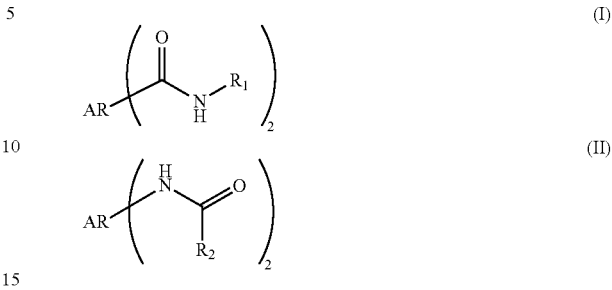

AR is selected from the group consisting of phenylene ($C_6H_4$) and naphthylene ($C_{10}H_6$). $R_1$ is selected from the group consisting of hydrogen (H), methyl ($CH_3$), ethyl ($CH_2CH_3$), phenyl ($C_6H_5$), and benzyl ($CH_2C_6H_5$). $R_2$ is selected from the group consisting of methyl ($CH_3$), ethyl ($CH_2CH_3$), phenyl ($C_6H_5$), and benzyl ($CH_2C_6H_5$). When AR is phenylene ($C_6H_4$), the substituents, $R_1$ or $R_2$, are located in the meta or para position relative to each other and when AR is naphthylene ($C_{10}H_6$), the substituents, $R_1$ or $R_2$, are located in the 1,3; 1,4; 1,5; 1,6; 1,7; 2,6; or 2,7 position relative to each other.

When we say that the polyester composition of the invention comprises at least one polyethylene terephthalate polyester, we mean that the polyester composition may be comprised of a single polymerization product, or the products of multiple polymerizations, whether the monomers of the multiple polyesters are the same or different, or the polyester composition of the invention may be the product of multiple polymerizations.

Similarly, the terephthalic acid may be provided by a single polyester, or may be provided by more than one polyethylene terephthalate homopolymer or copolymer, which may, for example, then be blended with one or more polyesters containing residues of unsaturated diols. Thus, when we say that the at least one polyethylene terephthalate polyester of the inventive polyester composition comprises residues of one or more monomers, not all of the polyesters need contain such residues, nor need the polyester composition contain more than one polyester, since a single polyester may contain all of the residues described. Similarly, when we say that the polyester composition comprises monomer residues, such monomer residues may be provided in a single polyester or in multiple polyesters, which polyesters may or may not be the same polyesters as those containing any other residues described.

Because polyesters may be blended with one another and afterward lose their separate characteristics, especially when blended at elevated temperatures, the way in which the residues of the polyester composition are provided to the polyester composition is not especially critical, unless otherwise indicated, although it may be advantageous in practice to prepare, for example, an additive concentrate, and afterward blend the additive concentrate with at least one polyethylene terephthalate polyester, in order to prepare an inventive polyester composition containing the desired residues.

The at least one polyethylene terephthalate polyester according to the invention may comprise at least 90 mole percent of the residues of terephthalic acid, or at least 92 mole percent of the residues of terephthalic acid, or at least 95 mole percent of the residues of terephthalic acid, or at least 97 mole percent of the residues of terephthalic acid, or at least 99 mole percent of the residues of terephthalic acid, or 100 mole percent of the residues of terephthalic acid, based on the entire amount of dicarboxylic acid component totaling 100 mole percent; and at least 90 mole percent of the residues of ethylene glycol, or at least 92 mole percent of the residues of ethylene glycol, or at least 95 mole percent of the residues of ethylene glycol, or at least 97 mole percent of the residues of ethylene glycol, or at least 99 mole percent of the residues of ethylene glycol, based on the entire amount of hydroxyl component totaling 100 mole percent.

The dicarboxylic acid component containing terephthalic acid may optionally be modified with minor amounts, for example up to 10 mole percent, of another dicarboxylic acid, or as otherwise provided herein. Optional dicarboxylic acids include aromatic dicarboxylic acids having 8 to 14 carbon atoms, aliphatic dicarboxylic acids having 4 to 12 carbon atoms, and cycloaliphatic dicarboxylic acids 8 to 12 carbon atoms. Combinations of dicarboxylic acids may also be used. Specific examples of dicarboxylic acids other than terephthalic acid include but are not limited to phthalic acid, isophthalic acid, naphthalenedicarboxylic acid, cyclohexanedicarboxylic acid, stilbenedicarboxylic acid, succinic acid, glutaric acid, adipic acid, and azelaic acid.

The hydroxyl component comprising ethylene glycol may optionally be modified with minor amounts, for example up to 10 mole percent, of one or more additional diols. Such additional diols include cycloaliphatic diols having 6 to 20 carbon atoms or aliphatic diols having 3 to 20 carbon atoms. Examples include but are not limited to: diethylene glycol (DEG); triethylene glycol; propane-1,3-diol; 1,4-cyclohexanedimethanol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2-ethylhexanediol-(1,3), 2,2-diethylpropane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

The polyester composition comprises at least one polyethylene terephthalate polyester in an amount ranging from 90 weight percent to 99.5 weight percent, 92 weight percent to 99.5 weight percent, 93 weight percent to 99.5 weight percent, 94 weight percent to 99.5 weight percent, 95 weight percent to 99.5 weight percent, 96 weight percent to 99.5 weight percent, 97 weight percent to 99.5 weight percent, 98 weight percent to 99.5 weight percent, 99 weight percent to 99.5 weight percent, 90 weight percent to 99 weight percent, 92 weight percent to 99 weight percent, 93 weight percent to 99 weight percent, 94 weight percent to 99 weight percent, 95 weight percent to 99 weight percent, 96 weight percent to 99 weight percent, 97 weight percent to 99 weight percent, 98 weight percent to 99 weight percent, 90 weight percent to 98 weight percent, 92 weight percent to 98 weight percent, 93 weight percent to 98 weight percent, 94 weight percent to 98 weight percent, 95 weight percent to 98 weight percent, 96 weight percent to 98 weight percent, 97 weight percent to 98 weight percent, 90 weight percent to 97 weight percent, 92 weight percent to 97 weight percent, 93 weight percent to 97 weight percent, 94 weight percent to 97 weight percent, 95 weight percent to 97 weight percent, or 96 weight percent to 97 weight percent, based on the total weight of the polyester composition or the weight of an article formed thereof.

The polyester composition further comprises at least one additive in an amount ranging from 0.5 weight percent to 10 weight percent, 0.5 weight percent to 8 weight percent, 0.5 weight percent to 7 weight percent, 0.5 weight percent to 6 weight percent, 0.5 weight percent to 5 weight, 0.5 weight percent to 4 weight percent, 0.5 weight percent to 3 weight percent, 0.5 weight percent to 2.5 weight percent, 0.5 weight percent to 2 weight percent, 0.5 weight percent to 1 weight percent, 1 weight percent to 10 weight percent, 1 weight percent to 8 weight percent, 1 weight percent to 7 weight percent, 1 weight percent to 6 weight percent, 1 weight percent to 5 weight percent, 1 weight percent to 4 weight percent, 1 weight percent to 3 weight percent, 1 weight percent to 2.5 weight percent, 1 weight percent to 2 weight percent, 2 weight percent to 10 weight percent, 2 weight percent to 8 weight percent, 2 weight percent to 7 weight percent, 2 weight percent to 6 weight percent, 2 weight percent to 5 weight percent, 2 weight percent to 4 weight percent, 2 weight percent to 3 weight percent, or 3 weight percent to 10 weight percent, 3 weight percent to 8 weight percent, 3 weight percent to 7 weight percent, 3 weight percent to 6 weight percent, or 3 weight percent to 5 weight percent, based on the total weight of the polyester composition or the weight of an article formed thereof.

The at least one additive comprises a compound represented by Formula (I) or (II) given below:

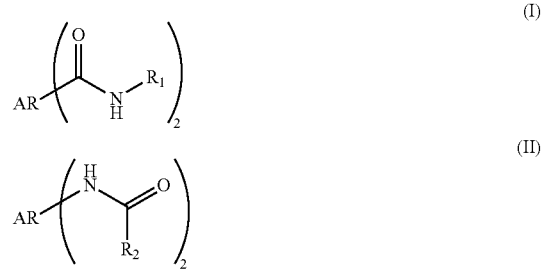

In an aspect of the invention, the at least one additive comprises a compound represented by Formula (I) wherein AR is phenylene ($C_6H_4$) and $R_1$ is selected from the group consisting of hydrogen (H), methyl ($CH_3$), ethyl ($CH_2CH_3$), phenyl ($C_6H_5$), and benzyl ($CH_2C_6H_5$). In another aspect, the at least one additive comprises a compound represented by Formula (I) wherein AR is phenylene ($C_6H_4$) and $R_1$ is selected from the group consisting of hydrogen (H), methyl ($CH_3$), and ethyl ($CH_2CH_3$), or $R_1$ is selected from the group consisting of hydrogen (H) and methyl ($CH_3$). In another aspect, the at least one additive comprises a compound represented by Formula (I) wherein AR is phenylene ($C_6H_4$) and $R_1$ is hydrogen.

In another aspect of the invention, the at least one additive comprises a compound represented by Formula (I) wherein AR is naphthylene ($C_{10}H_6$) and $R_1$ is selected from the group consisting of hydrogen (H), methyl ($CH_3$), ethyl ($CH_2CH_3$), phenyl ($C_6H_5$), and benzyl ($CH_2C_6H_5$). In another aspect, the at least one additive comprises a compound represented by Formula (I) wherein AR is naphthylene ($C_{10}H_6$) and $R_1$ is selected from the group consisting of hydrogen (H), methyl ($CH_3$), and ethyl ($CH_2CH_3$), or $R_1$ is selected from the group consisting of hydrogen (H) and methyl ($CH_3$). In another aspect, the at least one additive comprises a compound represented by Formula (I) wherein AR is naphthylene and $R_1$ is hydrogen.

In yet another aspect of the invention, the at least one additive comprises a compound represented by Formula (II) wherein AR is phenylene ($C_6H_4$) and $R_2$ is selected from the group consisting of methyl ($CH_3$), ethyl ($CH_2CH_3$), phenyl ($C_6H_5$), and benzyl ($CH_2C_6H_5$). In another aspect, the at least one additive comprises a compound represented by Formula (II) wherein AR is phenylene ($C_6H_4$) and $R_2$ is selected from the group consisting of methyl ($CH_3$) and ethyl ($CH_2CH_3$). In another aspect, the at least one additive comprises a compound represented by Formula (II) wherein AR is phenylene ($C_6H_4$) and $R_2$ is methyl ($CH_3$).

In another aspect of the invention, the at least one additive comprises a compound represented by Formula (II) wherein AR is naphthylene ($C_{10}H_6$) and $R_2$ is selected from the group consisting of methyl ($CH_3$), ethyl ($CH_2CH_3$), phenyl ($C_6H_5$), and benzyl ($CH_2C_6H_5$). In another aspect, the at least one additive comprises a compound represented by Formula (II) wherein AR is naphthylene ($C_{10}H_6$) and $R_2$ is selected from the group consisting of methyl ($CH_3$) and ethyl ($CH_2CH_3$). In another aspect, the at least one additive comprises a compound represented by Formula (II) wherein AR is naphthylene ($C_{10}H_6$) and $R_2$ is methyl ($CH_3$).

When the at least one additive is represented by either Formula (I) or Formula (II) and AR is a phenylene group ($C_6H_4$), the two substituents, $R_1$ or $R_2$, are located in the meta or the para position relative to each other.

When the at least one additive is represented by either Formula (I) or Formula (II) and AR is a naphthylene group ($C_{10}H_6$), the two substituents, $R_1$ or $R_2$, are located in the 1,3; 1,4; 1,5; 1,6; 1,7; 2,6; or 2,7 positions relative to each other. In another aspect, AR is a naphthylene ($C_{10}H_6$) wherein the two substituents, $R_1$ or $R_2$, are located in the 1,3; 1,5; 1,6; or 2,6 positions relative to each other. In another aspect, AR is a naphthylene ($C_{10}H_6$) wherein the two substituents, $R_1$ or $R_2$, are located in the 1, 5 or 2,6 positions relative to each other. In another aspect, AR is a naphthylene ($C_{10}H_6$) wherein the two substituents, $R_1$ or $R_2$, are located in the 1,3 position relative to each other.

Specific examples of the at least one additive of the present invention include, but are not limited to, N,N'-1,3-phenylenebispropanamide (CAS #25227-71-8), N,N'-1,3-phenylenebisbenzamide (CAS #17223-18-6), N,N'-1,3-naphthylenebisacetamide (CAS #92245-41-5), N,N'-1,3-naphthalenediylbenzeneacetamide (CAS # not found), N,N'-1,3-naphthalenediylbisbenzamide (CAS #97085-41-1), N,N'-1,3-naphthalenediylbispropanamide (CAS # not found), N,N'-1,5-napthalenediylbisporpanamide (CAS #121311-45-3), N,N'-1,5-naphthalenediylbisbenzamide (CAS #153250-58-9), N,N'-1,6-naphthalenediylbisacetamide (CAS #81955-85-3), N,N'-1,6-naphthalenediylbispropanamide (CAS # not found), N,N'-1,6-naphthalenediylbisbenzamide (CAS # not found), and N,N'-1,6-naphthalenediylbisbenzeneacetamide (CAS # not found).

In an aspect of the invention, the at least one additive is chosen from one or more of the group consisting of isophthalamide, 2,6-naphthalenedicarboxamide, terephthalamide, N,N'-bis(phenylmethyl)-2,6-naphthalenedicarboxamide, N,N'-bis(phenylmethyl)-1,3-benzenedicarboxamide, N,N'-bis(phenylmethyl)-1,4-benzenedicarboxamide, N,N'-1,3-phenylenebisacetamide, N,N'-1,5-naphthalenediylbisacetamide, N,N'-1,3-phenylenebisbenzeneacetamide, and N,N'-1,5-naphthalenediylbisbenzeneacetamide. In another aspect, the at least one additive is chosen from one or more of the group consisting of isophthalamide, 2,6-naphthalenedicarboxamide, terephthalamide, N,N'-bis(phenylmethyl)-2,6-naphthalenedicarboxamide, N,N'-bis(phenylmethyl)-1,3-benzenedicarboxamide, and N,N'-bis(phenylmethyl)-1,4-benzenedicarboxamide. In another aspect, the at least one additive is chosen from a group consisting of one or more of isophthalamide and terephthalamide. In another aspect, the at least one additive is chosen from one or more of a group consisting of N,N'-1,3-phenylenebisacetamide, N,N'-1,5-naphthalenediylbisacetamide, N,N'-1,3-phenylenebisbenzeneacetamide, and N,N'-1,5-naphthalenediylbisbenzeneacetamide. In another aspect, the at least one additive is chosen from one or more of a group consisting of N,N'-1,3-phenylenebisacetamide, and N,N'-1,5-naphthalenediylbisacetamide.

The at least one polyethylene terephthalate polyester has an intrinsic viscosity (It.V.) in the range of 0.64 dL/g to 1.2 dL/g, 0.64 dL/g to 1.15 dL/g, 0.64 dL/g to 1.1 dL/g, 0.66 dL/g to 1.2 dL/g, 0.66 dL/g to 1.15 dL/g, 0.66 dL/g to 1.1 dL/g, 0.68 dL/g to 1.2 dL/g, 0.68 dL/g to 1.15 dL/g, 0.68 dL/g to 1.1 dL/g, 0.70 dL/g to 1.2 dL/g, 0.70 dL/g to 1.15 dL/g, 0.70 dL/g to 1.1 dL/g, 0.72 dL/g to 1.2 dL/g, 0.72 dL/g to 1.15 dL/g, 0.72 dL/g to 1.1 dL/g, 0.74 dL/g to 1.2 dL/g, 0.74 dL/g to 1.15 dL/g, 0.74 dL/g to 1.1 dL/g, 0.76 dL/g to 1.2 dL/g, 0.76 dL/g to 1.15 dL/g, 0.76 dL/g to 1.1 dL/g, 0.78 dL/g to 1.2 dL/g, 0.78 dL/g to 1.15 dL/g, 0.78 dL/g to 1.1 dL/g, 0.80 dL/g to 1.2 dL/g, 0.80 dL/g to 1.15 dL/g, 0.80 dL/g to 1.1 dL/g, 0.82 dL/g to 1.2 dL/g, 0.82 dL/g to 1.15 dL/g, 0.82 dL/g to 1.1 dL/g, 0.84 dL/g to 1.2 dL/g, 0.84 dL/g to 1.15 dL/g, or 0.84 dL/g to 1.1 dL/g.

The polyester composition has an Intrinsic Viscosity (It.V.) in the range of 0.64 dL/g to 1.2 dL/g, 0.64 dL/g to 1.15 dL/g, 0.64 dL/g to 1.1 dL/g, 0.66 dL/g to 1.2 dL/g, 0.66 dL/g to 1.15 dL/g, 0.66 dL/g to 1.1 dL/g, 0.68 dL/g to 1.2 dL/g, 0.68 dL/g to 1.15 dL/g, 0.68 dL/g to 1.1 dL/g, 0.70 dL/g to 1.2 dL/g, 0.70 dL/g to 1.15 dL/g, 0.70 dL/g to 1.1 dL/g, 0.72 dL/g to 1.2 dL/g, 0.72 dL/g to 1.15 dL/g, 0.72 dL/g to 1.1 dL/g, 0.74 dL/g to 1.2 dL/g, 0.74 dL/g to 1.15 dL/g, 0.74 dL/g to 1.1 dL/g, 0.76 dL/g to 1.2 dL/g, 0.76 dL/g to 1.15 dL/g, 0.76 dL/g to 1.1 dL/g, 0.78 dL/g to 1.2 dL/g, 0.78 dL/g to 1.15 dL/g, 0.78 dL/g to 1.1 dL/g, 0.80 dL/g to 1.2 dL/g, 0.80 dL/g to 1.15 dL/g, 0.80 dL/g to 1.1 dL/g, 0.82 dL/g to 1.2 dL/g, 0.82 dL/g to 1.15 dL/g, 0.82 dL/g to 1.1 dL/g, 0.84 dL/g to 1.2 dL/g, 0.84 dL/g to 1.15 dL/g, or 0.84 dL/g to 1.1 dL/g.

The polyester composition of the invention can have a lower intrinsic viscosity than the at least one polyethylene terephthalate polyester. In an aspect of the invention, the mathematical difference between the intrinsic viscosity of the polyethylene terephthalate polyester and the intrinsic viscosity of the polyester composition is in the range of 0.01 dL/g to 0.20 dL/g, 0.01 dL/g to 0.15 dL/g, 0.01 dL/g to 0.1 dL/g, 0.05 dL/g to 0.20 dL/g, 0.05 dL/g to 0.15 dL/g, 0.05 dL/g to 0.1 dL/g, 0.07 dL/g to 0.20 dL/g, 0.07 dL/g to 0.15 dL/g, 0.07 dL/g to 0.1 dl/g, or 0.1 dL/g to 0.2 dL/g. In an aspect, the mathematical difference between the intrinsic viscosity of the polyethylene terephthalate polyester and the intrinsic viscosity of the polyester composition is less than 0.2 dL/g, less than 0.15 dL/g, less than 0.1 dL/g, less than 0.05 dL/g, or less than 0.03 dL/g.

In an aspect of the invention, the at least one polyethylene terephthalate polyester has a glass transition temperature ($T_g$) in the range of 60° C. to 120° C., 60° C. to 110° C., 60° C. to 100° C., 60° C. to 90° C., 70° C. to 120° C., 70° C. to 110° C., 70° C. to 100° C., or 70° C. to 90° C.

In an aspect, the polyester composition has a glass transition temperature ($T_g$) in the range of 60° C. to 120° C., 60° C. to 110° C., 60° C. to 100° C., 60° C. to 90° C., 70° C. to 120° C., 70° C. to 110° C., 70° C. to 100° C., or 70° C. to 90° C. In an aspect, the polyester composition has a glass transition temperature greater than 60° C., greater than 70° C., greater than 75° C., greater than 77° C., greater than 80° C., or greater than 90° C.

The polyester composition of the invention can have a lower $T_g$ than the at least one polyethylene terephthalate polyester. In an aspect, the mathematical difference between the $T_g$ of the at least one polyethylene terephthalate polyester and the $T_g$ of the polyester composition is less than 10° C., less than 9° C., less than 8° C., less than 7° C., less than 6° C., less than 5° C., less than 4° C., less than 3° C., less than 2° C., less than 1° C. In another aspect, the difference between the $T_g$ of the at least one polyethylene terephthalate polyester and the $T_g$ of the polyester composition is in the range of 0° C. to 10° C., 0° C. to 8° C., 0° C. to 5° C., 0° C. to 3° C., 0.5° C. to 10° C., 0.5° C. to 8° C., 0.5° C. to 5° C., 0.5° C. to 3° C., 1° C. to 10° C., 1° C. to 8° C., 1° C. to 5° C., 1° C. to 3° C., 2° C. to 10° C., 2° C. to 8° C., 2° C. to 5° C., or 2° C. to 3° C.

The polyester composition, with or without toners, can have color values L*, a* and b*. The color values are reported as average values measured on nominal 20 mil amorphous films. In certain aspects, the b* values for the polyester composition can be from −10 to less than 10 and the L* values can be from 50 to 90. In another aspect, the b* values for the polyester composition useful in the invention can be present in the range of −10 to 9; −10 to 8; −10 to 7; −10 to 6; −10 to 5; −10 to 4; −10 to 3; −10 to 2; −5 to 9; −5 to 8; −5 to 7; −5 to 6; −5 to 5; −5 to 4; −5 to 3; −5 to 2; −3 to 5; −3 to 4; −3 to 3, −3 to 2; −1 to 5; −1 to 4; −1 to 3; −1 to 2; 0 to 9; 0 to 8; 0 to 7; 0 to 6; 0 to 5; 0 to 4; 0 to 3; 0 to 2; 1 to 10; 1 to 9; 1 to 8; 1 to 7; 1 to 6; 1 to 5; 1 to 4; 1 to 3; or 1 to 2. In another aspect, the L* value for the polyester composition useful in the invention can be present the range of 50 to 60; 50 to 70; 50 to 80; 50 to 90; 50 to 100; 60 to 70; 60 to 80; 60 to 90; 60 to 100; 70 to 80; 70 to 90; or 70 to 100. In another aspect, the L* value for the polyester composition can be greater than 50, greater than 60, greater than 70, greater than 75, greater than 80, greater than 85, or greater than 90.

The polyester composition haze values as measured on a nominal 20 mil film can be less than 15 percent, less than 12 percent, less than 10 percent, less than 8 percent, less than 7 percent, less than 6 percent, less than 5 percent, less than 4 percent, less than 3 percent, less than 2 percent, or less than 1 percent.

The polyester composition of the invention may further comprise an oxidation catalyst. When the at least one additive comprises a benzyl substituent, the at least one additive can serve as an oxygen-scavenger. The oxidation catalysts useful according to the invention may comprise a transition metal salt, such as a cobalt salt, present in the polyester composition of the invention in amounts, based upon the metal, for example, from 10 ppm to 1,000 ppm, or from 20 ppm to 750 ppm, or from 25 ppm to 500 ppm, based on the total weight of the polyester composition. The metal may be added in salt form, most conveniently as carboxylate salts, such as cobalt octanoate, cobalt acetate, or cobalt neodecanoate.

Suitable oxidation catalysts include transition metal catalysts which can readily interconvert between at least two oxidation states. Preferably, the transition metal is in the form of a transition metal salt with the metal selected from the first, second or third transition series of the Periodic Table. Suitable metals include manganese II or III, iron II or III, cobalt II or III, nickel II or III, copper I or II, rhodium II, III or IV and ruthenium I, II or IV. Suitable counterions for the metal include, but are not limited to, chloride, acetate, acetylacetonate, stearate, palmitate, 2-ethylhexanoate, neodecanoate, octanoate, or naphthenate, and mixtures thereof. The metal salt may also be an ionomer, in which case a polymeric counterion is employed. Such ionomers are well known in the art. Any amount of catalyst which is effective in catalyzing oxygen scavenging may be used. Typical amounts of the metal in the polyester composition of the invention are in the range of 10 ppm to 500 ppm, 10 ppm to 250 ppm, 10 ppm to 200 ppm, 10 ppm to 150 ppm, 10 ppm to 100 ppm, 10 ppm to 80 ppm, 10 ppm to 60 ppm, 25 ppm to 500 ppm, 25 ppm to 250 ppm, 25 ppm to 200 ppm, 25 ppm to 150 ppm, 25 ppm to 100 ppm, 25 ppm to 80 ppm, 25 ppm to 60 ppm, 50 ppm to 500 ppm, 50 ppm to 250 ppm, 50 ppm to 200 ppm, 50 ppm to 150 ppm, 50 ppm to 100 ppm, or 50 ppm to 80 ppm, based on the total weight of the polyester composition. The reported amounts are based on the weight of the polyester composition and measured on the metal, not its compound weight as added to the polyester composition. In the case of cobalt as the oxygen scavenging transition metal, suitable amounts may be at least 20 ppm, or at least 30 ppm, or at least 50 ppm, or at least 60 ppm, or at least 75 ppm, or at least 100 ppm, or at least 125 ppm.

The form of the at least one polyethylene terephthalate polyester of the invention is not limited, nor the method of preparation, and includes a melt in the manufacturing process or in the molten state after polymerization, such as may be found in an injection molding machine, and in the form of a liquid, pellets, preforms, and/or bottles. The at least one polyester may be in the form of pellets isolated as a solid at 25° C. and 1 atm in order for ease of transport and processing. The shape of such pellets is not limited, and is typified by regular or irregular shaped discrete particles and may thus be distinguished from a sheet, film, or fiber.

The at least on polyethylene terephthalate polyester, also referred to as PET polymers, useful according to the invention may be prepared by transesterifying a dialkyl terephthalate or by directly esterifying a terephthalic acid with a diol. Further details of such processes are set forth below.

The PET polymers of the invention may be manufactured by reacting a diacid or diester component comprising at least 90 mole percent terephthalic acid or $C_1$-$C_4$ dialkylterephthalate, or at least 93 mole percent, or at least 95 mole percent, or at least 98 mole percent, and for many applications at least 99 mole percent, and a diol component, also referred to as a hydroxyl component, comprising, for example, at least 90 mole percent ethylene glycol, or at least 92 mole percent ethylene glycol, or at least 95 mole percent, or at least 96 mole percent. It is thus preferable that the diacid component is terephthalic acid and the diol component is ethylene glycol. As used herein, the mole percentage for all the diacid component(s) totals 100 mole percent, and the mole percentage for all the diol component(s) totals 100 mole percent.

The PET polymers may be prepared by conventional polymerization procedures sufficient to effect esterification and polycondensation. Polyester melt phase manufacturing processes include direct condensation of a dicarboxylic acid with a diol optionally in the presence of esterification catalysts in the esterification zone, followed by polycondensation in the prepolymer and finishing zones in the presence of a polycondensation catalyst; or else ester interchange usually in the presence of a transesterification catalyst in the esterification zone, followed by prepolymerization and finishing in the presence of a polycondensation catalyst, and each may optionally be subsequently solid-stated according to known methods. After melt phase polycondensation, and optional solid-stating, the PET polymers typically have an initial intrinsic viscosity (It.V.) ranging from 0.55 dL/g to about 0.70 dL/g as precursor pellets, if solid-stating is to be performed, and a final It.V. ranging from about 0.70 dL/g to about 1.15 dL/g.

Alternatively, the PET polymers of the polyester composition of the invention may be prepared entirely in the melt phase, by continuing melt-phase polycondensation such that the PET polymers made in this manner have an It.V. of at least 0.75 dL/g, or at least 0.8 dL/g, or at least 0.82 dL/g.

To further illustrate, a mixture of one or more dicarboxylic acids, including terephthalic acid or ester forming derivatives thereof, and one or more diols, including ethylene glycol, are continuously fed to an esterification reactor operated at a temperature of between about 200° C. and 300° C., typically from 230° C. to 290° C., or from 240° C. to 270° C., and at a pressure from about 1 psig to about 70 psig. The residence time of the reactants typically ranges from about one to about five hours. Normally, the dicarboxylic acid is directly esterified with diol(s) at elevated pressure and at a temperature from about 240° C. to about 270° C. The esterification reaction is continued until a degree of esterification of at least 60% is achieved, but more typically until a degree of esterification of at least 85% is achieved to make the desired monomer. The esterification monomer reaction is typically uncatalyzed in the direct esterification process and catalyzed in transesterification processes. Polycondensation catalysts may optionally be added in the esterification zone along with esterification/transesterification catalysts.

Typical esterification/transesterification catalysts which may be used include titanium alkoxides, dibutyl tin dilaurate, used separately or in combination, optionally with zinc, manganese, or magnesium acetates or benzoates and/or other such catalyst materials as are well known to those skilled in the art. Phosphorus-containing compounds and cobalt compounds may also be present in the esterification zone. The resulting products formed in the esterification zone include monomer, low molecular weight oligomers, DEG, and water as the condensation by-product, along with other trace impurities formed by the reaction of the catalyst and other compounds such as colorants or the phosphorus-containing compounds. The relative amounts of monomer and oligomeric species will vary depending on whether the process is a direct esterification process, in which case the amount of oligomeric species are significant and even present as the major species, or a transesterification process, in which case the relative quantity of monomer predominates over the oligomeric species. The water is removed as the esterification reaction proceeds and excess glycol is removed to provide favorable equilibrium conditions. The esterification zone typically produces the monomer and oligomer mixture, if any, continuously in a series of one or more reactors. Alternatively, the monomer and oligomer mixture could be produced in one or more batch reactors.

Once the ester monomer is made to the desired degree of esterification, it is transported from the esterification reactors in the esterification zone to the polycondensation zone comprised of a prepolymer zone and a finishing zone.

Polycondensation reactions are initiated and continued in the melt phase in a prepolymerization zone and finished in the melt phase in a finishing zone, after which the melt may be solidified into precursor solids in the form of chips, pellets, or any other shape. For convenience, solids are referred to as pellets, but it is understood that a pellet can have any shape, structure, or consistency. If desired, the polycondensation reaction may be continued by solid-stating the precursor pellets in a solid-stating zone. Alternatively, the It.V. build may be accomplished entirely in the melt phase, and a subsequent solid-stating step omitted entirely.

Although reference is made to a prepolymer zone and a finishing zone, it is to be understood that each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors or even one or more reaction steps or sub-stages performed in a single reactor vessel. In some reactor designs, the prepolymerization zone represents the first half of polycondensation in terms of reaction time, while the finishing zone represents the second half of polycondensation. While other reactor designs may adjust the residence time between the prepolymerization zone to the finishing zone at about a 2:1 ratio, a common distinction in all designs between the prepolymerization zone and the finishing zone is that the latter zone operates at a higher temperature, lower pressure, and a higher surface renewal rate than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the prepolymerization zone, also known in the industry as the low polymerizer, the low molecular weight monomers and minor amounts of oligomers are polymerized via polycondensation to form polyethylene terephthalate polyester in the presence of a catalyst. If the catalyst was not added in the monomer esterification stage, the catalyst is added at this stage to catalyze the reaction between the monomers and low molecular weight oligomers to form prepolymer and split off the diol as a by-product. If a polycondensation catalyst was added to the esterification zone, it is typically blended with the diol and fed into the esterification reactor as the diol feed. Other compounds such as phosphorus-containing compounds, cobalt compounds, and colorants can also be added in the prepolymerization zone. These compounds may, however, be added in the finishing zone instead of or in addition to the prepolymerization zone.

In a typical ester interchange-based process, those skilled in the art recognize that other catalyst material and points of adding the catalyst material and other ingredients may vary from a typical direct esterification process.

Typical polycondensation catalysts include the compounds of antimony, titanium, germanium, zinc and tin in an amount ranging from 0.1 ppm to 1,000 ppm based on the weight of resulting polyester polymer. A common polymerization catalyst added to the prepolymerization zone is an antimony-based polymerization catalyst. Suitable antimony-based catalysts include antimony (III) and antimony (V) compounds recognized in the art, and in particular, diol-soluble antimony (III) and antimony (V) compounds with antimony (III) being most commonly used. Other suitable compounds include those antimony compounds that react with, but are not necessarily soluble in, the diols, with examples of such compounds including antimony (III) oxide. Specific examples of suitable antimony catalysts include antimony (III) oxide and antimony (III) acetate, antimony (III) glycolates, antimony (III) ethyleneglycoxide and mixtures thereof, with antimony (III) oxide being preferred. The preferred amount of antimony catalyst added is that effective to provide a level of between about 75 ppm and about 400 ppm of antimony by weight of the resulting polyester.

The prepolymer polycondensation stage mentioned generally employs a series of two or more vessels and is operated at a temperature from about 250° C. to about 305° C. for from about one to about four hours. During this stage, the It.V. of the monomers and oligomers is typically increased up to about no more than 0.35 dL/g. The diol byproduct is removed from the prepolymer melt using an applied vacuum ranging from 15 torr to 70 torr to drive the reaction to completion. In this regard, the polymer melt is typically agitated to promote the escape of the diol from the polymer melt and to assist the highly viscous polymer melt in moving through the polymerization vessels. As the polymer melt is fed into successive vessels, the molecular weight and thus the intrinsic viscosity of the polymer melt increases. The temperature of each vessel is generally increased and the pressure decreased to allow for a greater degree of polymerization in each successive vessel. However, to facilitate removal of glycols, water, alcohols, aldehydes, and other reaction products, the reactors are typically run under a vacuum or purged with an inert gas. Inert gas is any gas which does not cause unwanted reaction or product characteristics at reaction conditions. Suitable gases include, but are not limited to, carbon dioxide, argon, helium, and nitrogen.

Once an It.V. of typically no greater than 0.35 dL/g, or no greater than 0.40 dL/g, or no greater than 0.45 dL/g, is obtained, the prepolymer is fed from the prepolymer zone to a finishing zone where the second half of polycondensation is continued in one or more finishing vessels ramped up to higher temperatures than present in the prepolymerization zone, perhaps to a value within a range of from 280° C. to 305° C., until the It.V. of the melt is increased from the It.V of the melt in the prepolymerization zone (typically 0.30 dL/g but usually not more than 0.35 dL/g) to an It.V, for example, in the range of from about 0.50 dL/g to about 0.70 dL/g. The final vessel, generally known in the industry as the "high polymerizer," "finisher," or "polycondenser," is operated at a pressure lower than used in the prepolymerization zone, typically within a range of between about 0.8 torr and 4.0 torr, or from about 0.5 torr to about 4.0 torr. Although the finishing zone typically involves the same basic chemistry as the prepolymer zone, the fact that the size of the molecules, and thus the viscosity, differs, means that the reaction conditions also differ. However, like the prepolymer reactor, each of the finishing vessel(s) is connected to a flash vessel and each is typically agitated to facilitate the removal of ethylene glycol.

Alternatively, if a melt-phase-only polycondensation process is employed in the absence of a solid-stating step, the finisher is operated under similar temperatures and pressures, except that the It.V. of the melt is increased in the finisher to an It.V. in the range of from 0.70 dL/g up to 1.0 dL/g, or up to 1.1 dL/g, or up to 1.2 dL/g.

The PET polymers of the present invention may include a catalyst system comprising aluminum atoms, for example in an amount of at least 3 ppm based on the weight of the polymer, as well as one or more alkaline earth metal atoms, alkali metal atoms, or alkali compound residues, for example lithium. Such polymers typically have an It.V. of at least 0.72 dL/g obtained during melt phase polymerization.

The PET polymers include those disclosed and claimed in U.S. Pub. No. 2007/0066791, the disclosure of which is incorporated herein by reference in its entirety.

In another aspect, the PET polymers may comprise aluminum atoms, as well as one or more alkaline earth metal atoms, alkali metal atoms, or alkali compound residues, provided as a catalyst system, and further comprise a catalyst deactivator effective to at least partially deactivate the catalytic activity of the combination of the aluminum atoms and the alkaline earth metal atoms, alkali metal atoms, or alkali compound residues.

In one aspect, the PET polymers are made by a process comprising polycondensing a polyester polymer melt in the presence of aluminum atoms and one or more alkaline earth metal atoms, alkali metal atoms, or alkali compounds.

In yet another aspect of the invention, the PET polymers suitable for use according to the invention may be produced by a process that includes a step of adding catalyst deactivator to a polyester melt containing aluminum atoms and alkaline earth metal atoms or alkali metal atoms or alkali compound residues, for example lithium atoms, wherein the catalyst deactivator is added to the polyester melt when one or more of the following conditions are satisfied, or thereafter, and before solidification of the polyester melt:

a) the polyester melt reaches an It.V. of at least 0.50 dL/g, or
b) vacuum applied to the polyester melt, if any, is at least partially released, or
c) if the polyester melt is present in a melt phase polymerization process, adding the phosphorus compound within a final reactor for making the polyester polymer or between the final reactor and before a cutter for cutting the polyester melt, or
d) if the polyester melt is present in a melt phase polymerization process, following at least 85% of the time for polycondensing the polyester melt; or
e) the It.V. of the polyester melt is within 0.10 dL/g of the It.V. obtained upon solidification; or
f) at a point within 20 minutes or less of solidifying the polyester melt.

Thus, the PET polymers useful according to the invention may comprise, as a catalyst system, aluminum atoms and one or more alkaline earth atoms, alkali metal atoms, or alkali compound residues, optionally deactivated with one or more catalyst deactivators.

The aluminum atoms may be present, for example, in an amount from 1 ppm to 35 ppm, or from 5 ppm to 25 ppm, or from 10 ppm to 20 ppm, in each case based on the total weight of the at least on polyethylene terephthalate polyester.

The one or more alkaline earth atoms, alkali metal atoms, or alkali compound residues may be present, for example, in a total amount from 1 ppm to 25 ppm, or from 1 ppm to 20 ppm, or from 5 ppm to 18 ppm, or from 8 ppm to 15 ppm, in each case based on the total weight of the at least one polyethylene terephthalate polyester.

In one aspect, the one or more alkaline earth atoms, alkali metal atoms, or alkali compound residues comprises lithium. In this aspect, the amount of lithium may be, for example, from 1 ppm to 25 ppm, or from 5 ppm to 20 ppm, or from 8 ppm to 15 ppm, in each case based on the total weight of the at least one polyethylene terephthalate polyester.

In the processes by which the PET polymers are prepared, the catalyst systems used may optionally be deactivated by one or more catalyst deactivators, for example phosphorus atoms. If present, the amount of phosphorus atoms may range, for example, up to 150 ppm, or up to 115 ppm, or up to 70 ppm, based on the total weight of the at least one polyethylene terephthalate polyester.

In one aspect, the PET polymers may have an It.V. in the range, for example of 0.50 dL/g to 1.1 dL/g, or IhV's in the range of 0.70 dL/g to 0.85 dL/g, which may be achieved entirely in the melt phase.

In the processes by which the PET polymers are produced, the final IV of the polyester polymer is thus typically attained entirely in the melt phase polymerization process. This in contrast with conventional processes, in which the molecular weight of the polyester polymer is increased to a moderate IV, solidified, and then followed by solid-phase polymerization to continue the molecular weight increase to the final desired higher IV. The conventional process does not permit appreciable catalyst deactivation in the melt phase, because the subsequent solid-phase polymerization requires catalysis. Since the process is capable of building the molecular weight to the desired final IV entirely in the melt phase, the catalyst may be at least partially deactivated to thereby avoid at least some of the catalytic activity upon subsequent melting of particles, which is a common contributor to the generation of additional acetaldehyde.

Thus, in one aspect, the PET polymers comprise aluminum atoms, present in an amount of at least 3 ppm based on the weight of the polymer, said polymer having an It.V. of at least 0.72 dL/g obtained through a melt phase polymerization. In some aspects, the PET polymers exhibit a reduced residual acetaldehyde content, for example 10 ppm or less.

In another aspect, the PET polymers may comprise: (i) aluminum atoms, (ii) alkaline earth metal atoms or alkali metal atoms or alkali compound residues, and (iii) a catalyst deactivator in an amount effective to at least partially deactivate the catalytic activity of the combination of said (i) aluminum atoms and (ii) alkaline earth metal atoms or alkali metal atoms or alkali compound residues.

The residence time in the polycondensation vessels and the feed rate of the diol and the acid into the esterification zone in a continuous process is determined in part based on the target molecular weight of the at least one polyethylene terephthalate polyester. Because the molecular weight can be readily determined based on the intrinsic viscosity of the polymer melt, the intrinsic viscosity of the polymer melt is generally used to determine polymerization conditions, such as temperature, pressure, the feed rate of the reactants, and the residence time within the polycondensation vessels.

Once the desired It.V. is obtained in the finisher, the melt may be fed to a pelletization zone where it is filtered and extruded into the desired form. The polyesters may be filtered to remove particulates over a designated size, followed by extrusion in the melt phase to form, for example, polymer sheets or pellets. Although this zone is termed a "pelletization zone", it is understood that this zone is not limited to solidifying the melt into the shape of pellets, but includes solidification into any desired shape. Preferably, the polymer melt is extruded immediately after polycondensation. After extrusion, the polymers are quenched, preferably by spraying with water or immersing in a water trough, to promote solidification. The solidified condensation polymers are cut into any desired shape, including pellets.

Alternatively, once the polyester polymer is manufactured in the melt phase polymerization, it may be solidified. The method for solidifying the polyester polymer from the melt phase process is not limited. For example, molten polyester polymer from the melt phase may be directed through a die, or merely cut, or both directed through a die followed by cutting the molten polymer. A gear pump may be used as the motive force to drive the molten polyester polymer through the die. Instead of using a gear pump, the molten polyester polymer may be fed into a single or twin screw extruder and extruded through a die, optionally at a temperature of 190° C. or more at the extruder nozzle. Once through the die, the polyester polymer may be drawn into strands, contacted with a cool fluid, and cut into pellets, or the polymer may be pelletized at the die head, optionally underwater. The polyester polymer melt is optionally filtered to remove particulates over a designated size before being cut. Any conventional hot pelletization or dicing method and apparatus can be used, including but not limited to dicing, strand pelletizing and strand (forced conveyance) pelletizing, pastillators, water ring pelletizers, hot face pelletizers, underwater pelletizers, and centrifuged pelletizers.

The method and apparatus used to crystallize the polyester polymer is not limited, and includes thermal crystallization in a gas or liquid. The crystallization may occur in a mechanically agitated vessel; a fluidized bed; a bed agitated by fluid movement; an un-agitated vessel or pipe; crystallized in a liquid medium above the glass transition temperature ($T_g$) of the polyester polymer, preferably at 140° C. to 190° C.; or any other means known in the art. Also, the polymer may be strain crystallized. The polymer may also be fed to a crystallizer at a polymer temperature below its $T_g$ (from the glass), or it may be fed to a crystallizer at a polymer temperature above its $T_g$.

For example, molten polymer from the melt phase polymerization reactor may be fed through a die plate and cut underwater, and then immediately fed to an underwater thermal crystallization reactor where the polymer is crystallized underwater. Alternatively, the molten polymer may be cut, allowed to cool to below its $T_g$, and then fed to an underwater thermal crystallization apparatus or any other suitable crystallization apparatus. Or, the molten polymer may be cut in any conventional manner, allowed to cool to below its $T_g$, optionally stored, and then crystallized. Optionally, the crystallized polyester may be solid stated according to known methods.

The pellets formed from the PET polymers may be subjected to a solid-stating zone wherein the solids are first crystallized followed by solid-state polymerization (SSP) to further increase the It.V. of the solids from the It.V. exiting the melt phase to the desired It.V. useful for the intended end use. Typically, the It.V. of solid stated polyester solids ranges from 0.70 dL/g to 1.15 dL/g. In a typical SSP process, the crystallized pellets are subjected to a countercurrent flow of nitrogen gas heated to 180° C. to 220° C., over a period of time as needed to increase the It.V. to the desired target.

Thereafter, the PET polymer solids may be blended with the at least one additive or additive concentrate. At this stage, the pellets are typically fed into an injection molding machine suitable for making preforms which are stretch blow molded into bottles.

According to various aspects of the invention, various additional additives, not to be confused with the diamide compounds of the at least one additive, can be included in the at least one polyethylene terephthalate polyester and/or polyester compound as are well known to those skilled in the art. Additional additives such as reheat additives, for example titanium nitride particles, may be added at any point during polymerization of the PET polymers, or afterward, including to the esterification zone, to the polycondensation zone comprised of the prepolymer zone and the finishing zone, to or prior to the pelletizing zone, and at any point between or among these zones. The titanium nitride particles may also be added to solid-stated pellets as they are exiting the solid-stating reactor. Furthermore, reheat additives such as titanium nitride particles may be added to the PET pellets in combination with other feeds to the injection molding machine, or may be fed separately to the injection molding machine. For clarification, the titanium nitride particles may be added in the melt phase or to an injection molding machine without solidifying and isolating the at least one polyethylene terephthalate polyester into pellets. Thus, the titanium nitride particles can also be added in a melt-to-mold process at any point in the process for making preforms or other shaped articles. In each instance at a point of addition, the titanium nitride particles can be added as a powder neat, or in a liquid, or a polymer concentrate, and can be added to virgin or recycled PET, or added as a polymer concentrate using virgin or recycled PET as the PET polymer carrier.

Other components may also be added to the at least one polyethylene terephthalate polyester and/or the polyester composition of the present invention to enhance the performance properties of the polyester composition. For example, crystallization aids, impact modifiers, surface lubricants, denesting agents, antioxidants, ultraviolet light absorbing agents, catalyst deactivators, colorants, nucleating agents, acetaldehyde reducing compounds, other reheat rate enhancing aids, sticky bottle additives such as talc, and fillers and the like can be included. The at least one polyethylene terephthalate polyester may also contain small amounts of branching agents such as trifunctional or tetrafunctional comonomers such as trimellitic anhydride, trimethylol propane, pyromellitic dianhydride, pentaerythritol, and other polyester forming polyacids or diols generally known in the art. All of these additional additives and many others and their use are well known in the art and do not require extensive discussion. Any of these compounds can be used in the present polyester composition. It is preferable that the present polyester composition be essentially comprised of a blend of the at least one polyethylene terephthalate polyester and the at least one additive, either neat or in the form of an additive concentrate, with only a modifying amount of other ingredients being present.

The at least one polyethylene terephthalate polyester of the invention optionally may contain one or more additional UV-absorbing compounds. One example includes UV-absorbing compounds which are covalently bound to the polyester molecule as either a comonomer, a side group, or an end group. Suitable UV-absorbing compounds are thermally stable at polyester processing temperatures, absorb in the range of from about 320 nm to about 380 nm, and migrate minimally from the polymer. The UV-absorbing compounds preferably provide less than about 20%, more preferably less than about 10%, transmittance of UV light having a wavelength of 370 nm through a bottle wall or sample that is 0.012 inches thick. Suitable chemically reactive UV absorbing compounds may include, for example, substituted methine compounds.

Suitable compounds, their methods of manufacture and incorporation into polyesters include those disclosed in U.S. Pat. No. 4,617,374, the disclosure of which is incorporated herein by reference in its entirety. Other suitable UV-absorbing materials include benzophenone, benzotriazole, triazine, benzoxazinone derivatives. These UV-absorbing compound(s) may be present in amounts between about 1 ppm to about 5,000 ppm by weight, preferably from about 2 ppm to about 1,500 ppm, and more preferably between about 10 ppm and about 1000 ppm by weight. Dimers of the UV absorbing compounds may also be used. Mixtures of two or more UV absorbing compounds may be used. Moreover, because the UV absorbing compounds are reacted with or copolymerized into the backbone of the polymer, the resulting polymers display improved processability including reduced loss of the UV absorbing compound due to plate out and/or volatilization and the like.

The polyester composition of the invention may also, optionally, contain color stabilizers, such as certain cobalt compounds. These cobalt compounds can be added as cobalt acetates or cobalt alcoholates (cobalt salts or higher alcohols). They can be added as solutions in ethylene glycol. Polyester resins containing high amounts of the cobalt additives can be prepared as a master batch for extruder addition. The addition of the cobalt compounds as color toners is a process used to minimize or eliminate the yellow color, measured as b*, of the resin. Other cobalt compounds such as cobalt aluminate, cobalt benzoate, cobalt chloride and the like may also be used as color stabilizers. It is also possible to add certain diethylene glycol (DEG) inhibitors to reduce or prevent the formation of DEG in the final resin product. Preferably, a specific type of DEG inhibitor would comprise a sodium acetate-containing composition to reduce formation of DEG during the esterification and polycondensation of the applicable diol with the dicarboxylic acid or hydroxyalkyl, or hydroxyalkoxy substituted carboxylic acid. It is also possible to add stress crack inhibitors to improve stress crack resistance of bottles, or sheeting, produced from this resin.

The manufacturing method of the at least one additive is not particularly limited and can be done by any means known to those skilled in the art. The at least one additive of the invention, the diamide compound, can be purchased commercially and/or synthesized by those skilled in the art using readily known methods without undue experimentation. Examples of commercial compounds include isophthalamide and terephthalamide available from TCI America (9211 N. Harborgate Street, Portland, Oreg. 97203). Examples of synthesis methods of the at least one additive of the invention are documented in the Examples section herein below.

The process for making the above described polyester composition of the invention is not particularly limited. Non-limiting examples include the following processes. The at least one polyethylene terephthalate polyester and the at least one additive may be blended in a variety of manners, for instance by melt blending in which both components are fully or partially melted, by melt blending via an extruder. Alternatively, the at least one additive can be compounded into an additive concentrate which can later be compounded with the at least one polyethylene terephthalate. Also, the at least one additive can be added to the at least one polyethylene terephthalate polyester during the production of the at least one polyethylene terephthalate polyester, for example the at least one additive can be fed to the finishing reactor. One skilled in the art can readily make the polyester composition of this invention by these and other means known in the art.

In another embodiment, we have discovered a process for making a polyester polymer composition comprising: feeding at least one polyethylene terephthalate polyester and at least one additive to an extruder, and melt blending the at least one polyethylene terephthalate polyester and the at least one additive to form the polyester composition.

The at least one additive having the general formula (I) or (II) given below:

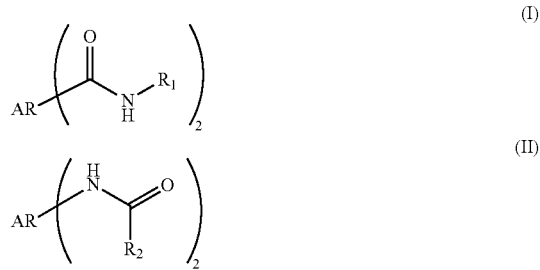

The AR is selected from the group consisting of phenylene ($C_6H_4$) and naphthylene ($C_{10}H_6$). $R_1$ is selected from the group consisting of hydrogen (H), methyl ($CH_3$), ethyl ($CH_2CH_3$), phenyl ($C_6H_5$), and benzyl ($CH_2C_6H_5$). $R_2$ is selected from the group consisting of methyl ($CH_3$), ethyl ($CH_2CH_3$), phenyl ($C_6H_5$), and benzyl ($CH_2C_6H_5$), When AR is phenylene ($C_6H_4$), the substituents, $R_1$ or $R_2$, are located in the meta or para position relative to each other and when AR is naphthylene ($C_{10}H_6$), the substituents, $R_1$ or $R_2$, are located in the 1,3; 1,4; 1,5; 1,6; 1,7; 2,6; or 2,7 position relative to each other. The amount of the at least one polyethylene terephthalate polyester is in the range of 94.0 weight percent to 99.5 weight percent and the amount of the at least one additive is in the range of 0.5 weight percent to 6.0 weight percent, each based on the total weight of the polyester composition.

The at least one additive can be added neat or in a carrier (such as a liquid or wax) to an extruder or other device for making an article comprising the polyester composition of the invention, or it can be added in a concentrate with an additional polyester or other thermoplastic polymer, or in a concentrate with a PET/polyester blend. The carrier may either be reactive or non-reactive with the polyesters and either volatile or non-volatile carrier liquids may be employed.

In one aspect, the process for making the polyester composition comprises melt blending the at least one polyethylene terephthalate polyester with an additive concentrate. The additive concentrate may comprise the at least one polyethylene terephthalate polyester as described herein or another thermoplastic polymer and the at least one additive as described herein. The at least one additive may be present in the additive concentration in amounts ranging from 5 weight percent to 50 weight percent, 5 weight percent to 40 weight percent, 5 weight percent to 30 weight percent, 5 weight percent to 20 weight percent, 5 weight percent to 10 weight percent, 10 weight percent to 50 weight percent, 10 weight percent to 40 weight percent, 10 weight percent to 30 weight percent, or 10 weight percent to 20 weight percent. The polyester used to make the additive concentrated may be the same or different from the at least one polyethylene terephthalate polyester used to make the polyester composition.

If a transition metal is added as an oxidation catalyst, it can be added neat or in a transition metal concentrate. The transition metal concentrate may comprise the at least one polyethylene terephthalate polyester as described herein or another thermoplastic polymer and the transition metal as described herein. For example, a transition metal salt may be present in amounts from 35 ppm to 5,000 ppm or more, or from 100 ppm to 3,000 ppm, or from 500 ppm to 2,500 ppm, based on the total weight of the transition metal concentrate. A transition metal concentrate may be blended with the at least one polyethylene terephthalate polyester for improved transition metal dispersion and or improved economics in making some embodiments of the inventive polyester composition.

It should be further understood that the above process for making the polyester composition includes the embodiments of the polyester composition as described herein above. For example, the above description of the at least one polyethylene terephthalate polyester, the various weight percentages of the at least one polyethylene terephthalate polyester and the at least one additive, the chemical structure of the at least one additive, the intrinsic viscosity, the glass transition temperature, the color characteristics, the transition metal, and any combination thereof apply to embodiments of the process for making the polyester composition.

In another embodiment, we have discovered an article comprising a polyester polymer composition comprising: at least one polyethylene terephthalate polyester in an amount ranging from 94.0 weight percent to 99.5 weight percent and at least one additive in an amount ranging from 0.5 weight percent to 6.0 weight percent, each based on the total weight of the polyester composition. The at least one additive having the general formula (I) or (II) given below:

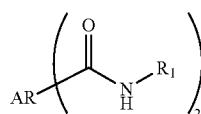

(I)

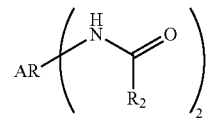

(II)

AR is selected from the group consisting of phenylene ($C_6H_4$) and naphthylene ($C_{10}H_6$). $R_1$ is selected from the group consisting of hydrogen (H), methyl ($CH_3$), ethyl ($CH_2CH_3$), phenyl ($C_6H_5$), and benzyl ($CH_2C_6H_5$). $R_2$ is selected from the group consisting of methyl ($CH_3$), ethyl ($CH_2CH_3$), phenyl ($C_6H_5$), and benzyl ($CH_2C_6H_5$). When AR is phenylene ($C_6H_4$), the substituents, $R_1$ or $R_2$, are located in the meta or para position relative to each other and when AR is naphthylene ($C_{10}H_6$), the substituents, $R_1$ or $R_2$, are located in the 1,3; 1,4; 1,5; 1,6; 1,7; 2,6; or 2,7 position relative to each other.

The polyester composition of the present invention is suitable for forming a variety of shaped articles, including films, sheets, tubes, preforms, molded articles, containers and the like. Suitable processes for forming the articles are known and include extrusion, extrusion blow molding, melt casting, injection molding, stretch blow molding, thermoforming, and the like.

For example, the polyester composition of the present invention may be used to form a preform used for preparing packaging containers. The preform is typically heated above the glass transition temperature of the polyester composition by passing the preform through a bank of quartz infrared heating lamps, positioning the preform in a bottle mold, and then blowing pressurized air through the open end of the mold. Any type of bottle can be made from the polyester composition of the invention. Thus, in one aspect, there is provided a beverage bottle made from the polyester composition of the present invention suitable for holding water. In another aspect, there is provided a heat-set beverage bottle suitable for holding beverages which are hot-filled into the bottle. In yet another aspect, the bottle is suitable for holding carbonated soft drinks. Further, in yet another aspect, the bottle is suitable for holding alcoholic beverages.

The polyester composition of the invention may be used alone, or in further polymer blends, or as a layer in a multilayer structure, prepared by co-injection, co-extrusion, lamination, or coating. These multilayer structures can be formed into articles by any forming technique known in the art such as blow molding, thermoforming, and injection molding. Alternatively, the polyester composition of the present invention may be incorporated into one layer. Suitable multilayer structures include three layer structures where the polyester composition is incorporated into a center layer, four layer structures where the polyester composition is incorporated into at least one of the intermediate layers, and five layer structures where the polyester composition may be incorporated into either the center layer or the second and fourth layers. In four and five layer articles the additional internal layers may comprise performance polymers such as barrier polymers, recycled polymer, and the like. Additionally the polyester composition of the present invention may be blended with recycled polymers. Generally the inner and outermost layers will be made from virgin polymer which is suitable for the desired end use. Thus, for example, for a food or beverage container, the inner and outermost layers would be made from a suitable polyester, such as PET.

Embodiments of the article comprising the polyester composition may incorporate the embodiments of the polyester composition and the embodiments for making the polyester composition as described herein above. For example, the above description of the at least one polyethylene terephthalate polyester, the various weight percentages of the at least one polyethylene terephthalate polyester and the at least one additive, the chemical structure of the at least one additive, the intrinsic viscosity, the glass transition temperature, the color characteristics, the transition metal, the additive concentrate, the transition metal concentrate, and any combination thereof apply to embodiments of the article comprising the polyester composition.

In another embodiment, we have discovered a process for making an article comprising: feeding at least one polyethylene terephthalate polyester and at least one additive to an extruder, and melt blending the at least one polyethylene terephthalate polyester and the at least one additive to form the polyester composition, and forming the article.

The at least one additive having the general formula (I) or (II) given below:

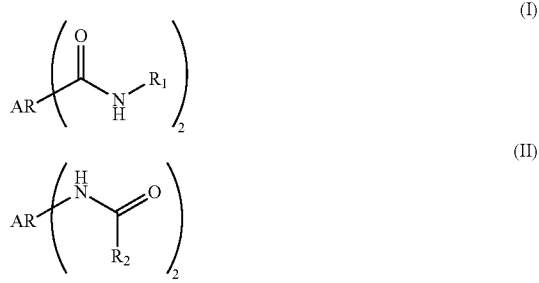

AR is selected from the group consisting of phenylene ($C_6H_4$) and naphthylene ($C_{10}H_6$). $R_1$ is selected from the group consisting of hydrogen (H), methyl ($CH_3$), ethyl ($CH_2CH_3$), phenyl ($C_6H_5$), and benzyl ($CH_2C_6H_5$). $R_2$ is selected from the group consisting of methyl ($CH_3$), ethyl ($CH_2CH_3$), phenyl ($C_6H_5$), and benzyl ($CH_2C_6H_5$), When AR is phenylene ($C_6H_4$), the substituents, $R_1$ or $R_2$, are located in the meta or para position relative to each other and when AR is naphthylene ($C_{10}H_6$), the substituents, $R_1$ or $R_2$, are located in the 1,3; 1,4; 1,5; 1,6; 1,7; 2,6; or 2,7 position relative to each other. The amount of the at least one polyethylene terephthalate polyester is in the range of 94.0 weight percent to 99.5 weight percent and the at least one additive is in the range of 0.5 weight percent to 6.0 weight percent of the polyester composition, each based on the total weight of the polyester composition.

The invention also provides processes for making a shaped article, for example, preforms or injection-molded bottles from the polyester composition of the invention, the processes comprising feeding the at least one polyethylene terephthalate polyester and at least one additive or additive concentrate to a machine for manufacturing the preform or bottle, the at least one polyethylene terephthalate polyester and at least one additive or additive concentrate being describe elsewhere.

Embodiments of the process for making an article comprising the polyester composition may incorporate the embodiments of the polyester composition, the embodiments for making the polyester composition, and the embodiment of the article comprising the polyester composition as described herein above. For example, the above description of the at least one polyethylene terephthalate polyester, the various weight percentages of the at least one polyethylene terephthalate polyester and the at least one additive, the chemical structure of the at least one additive, the intrinsic viscosity, the glass transition temperature, the color characteristics, the, transition metal, the additive concentrate, the transition metal concentrate, the type of article, and any combination thereof apply to embodiments of the process for making the article comprising polyester composition.

The invention can be further illustrated by the following examples, although it will be understood that these examples are included merely for purposes of illustration and are not intended to limit the scope of the invention unless otherwise specifically indicated.

EXAMPLES

Methods for Additive Compound Characterizations

All solvents and reagents were obtained from commercial sources and used as received. The synthesis was performed under a nitrogen atmosphere. Melting point determination for the product was made on a TA Instruments Model 2920 dual cell DSC equipped with Thermal Advantage operation software. A liquid nitrogen cooling accessory was connected to the DSC. The DSC was calibrated with Indium and Lead in regular aluminum capsules. DSC scans were taken from 0 to 290° C. (except for Additive B which had a higher melting point and so the DSC scans were taken from 0 to 360° C.) at a heating rate of 20° C./min. with the presence of nitrogen. Data were analyzed by TA Instruments Universal software. $^1$H NMR spectra was obtained on a Varian Mercury 300 NMR spectrometer. Chemical shifts of $^1$H NMR are recorded in ppm (δ) downfield from TMS as an internal standard. Liquid Chromatography-Mass Spectroscopy (LC-MS) for the purified product exhibited a peak for the product at 9.25 minutes. The measurement was obtained using an HP Series 1100 liquid chromatograph fitted with a Varian Polaris (4.6×50 mm) column. A post-column diode array detector (200-900 nm) was used to detect the product. A solution was made by dissolving approximately 5 mg/ml into N,N'-dimethylformamide (DMF). The initial conditions of the mobile phase were 100% water (with 2.5 mM ammonium acetate) and 0% acetonitrile (ACN). A gradient elution was performed as follows: zero time-100% water, 0% ACN, 1.5 ml/min flow; time 20 minutes-0% water, 100% ACN, 1.5 ml/min flow; 30 minutes-0% water, 100% ACN, 1.5 ml/min flow. Mass Spectra was acquired with a Micromass LCT mass spectrometer coupled to the LC. The mass spectra were collected using electrospray ionization in the positive-ion as well as the negative-ion mode. Ammonium acetate (50 mM in methanol) was added post-column (0.1 mL/min) to enhance the ionization efficiency through the addition of an ammonium adduct.
Method for Determining the % Additive The determination of the total chemically-bound nitrogen was performed using a Mitsubishi TN-110 Total Nitrogen Analyzer. Samples were pyrolyzed in an argon/oxygen atmosphere and were combusted at 800-1000° C. All chemically-bound nitrogen was converted to nitric oxide. In the chemiluminescence detector, the nitric oxide reacts with ozone to form excited nitrogen dioxide, which rapidly decays and produces light in the 590-2900 nm range. The emitted light is a measure of the total chemically-bound nitrogen. The weight of each additive in a sample was calculated using the molecular formula of each additive (i.e., knowing how many nitrogen atoms were present and the number of nitrogen atoms in each additive, the number of moles of each additive and weight of each additive can be calculated). The weight percent of each additive is simply the calculated weight of each additive divided by the weight of the sample.

Method for Determining the Intrinsic Viscosity

Polymer samples were dissolved in the solvent at a concentration of 0.50 g/100 mL. The inherent viscosity is calculated from the measured solution viscosity. The following equations describe these solution viscosity measurements, and subsequent calculations to Ih.V. and from Ih.V. to It.V:

$$\eta_{inh}=[\ln(t_s/t_o)]/C$$

where $\eta_{inh}$=Inherent viscosity at 25° C. at a polymer concentration of 0.50 g/100 mL of 60% phenol and 40% 1,1,2,2-tetrachloroethane
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int}=\lim_{C \to 0}(\eta_{sp}/C)=\lim_{C \to 0} \ln(\eta_r/C)$$

where
$\eta_{int}$=Intrinsic viscosity
$\eta_r$=Relative viscosity=$t_s/t_o$
$\eta_{sp}$=Specific viscosity=$\eta_r-1$ Instrument calibration involves replicate testing of a standard reference material and then applying appropriate mathematical equations to produce the "accepted" Ih.V. values.

Calibration Factor=Accepted Ih.V. of Reference Material/Average of Replicate Determinations Corrected Ih.V.=Calculated Ih.V.×Calibration Factor The intrinsic viscosity (It.V. or $\eta_{int}$) may be estimated using the Billmeyer equation as follows:

$$\eta_{int}=0.5[e^{0.5 \times Corrected\ Ih.V.}-1]+(0.75 \times Corrected\ Ih.V.)$$

The reference for calculating intrinsic viscosity (Billmeyer relationship) is *J. Polymer Sci.*, 4, 83-86 (1949).

Alternatively, the It.V. can be determined using the above solvents and concentrations measured according to ASTM D 5225-98 using a differential viscometer as the measuring device.

The intrinsic viscosity may be measured on the at least one polyethylene terephthalate polyester, in which case the 0.5 g polyester dissolved in the solvent is the at least one polyethylene terephthalate polyester. Alternatively, the intrinsic viscosity may be measured on the polyester composition, in which case the 0.5 g polyester dissolved in the solvent is the polyester composition.

Method for Determining the Glass Transition Temperature

The glass transition temperature can be determined from a second DSC heating scan as given in ASTM D3418. In general, an 8±1 mg sample of the polymer made up of (1) a portion of a single pellet or (2) a sample taken from several grams of cryogenically ground pellets is heated from about 25° C. and to about 290° C. at a heating rate of 20° C./minute to erase the previous thermal history. The sample is held at 290° C. for two minutes. The sample is quenched between two cold metal bars quickly enough that the sample remains essentially amorphous. The sample is again placed in the DSC and heated at a rate of 20° C./min. The glass transition temperature is measured at the half height between the baseline from glassy state of the transition (where started at the onset of the transition) and the baseline from the rubbery state (where ended at the end temperature of the transition), a 5-point determination.

Method for Determining L*, a*, and b*

Color measurements, unless expressly stated otherwise, were conducted on nominally 20 ml thick amorphous films. Color of flat films were measured in total transmittance (TT-RAN) mode using a HunterLab UltraScan PRO spectrophotometer that has been standardized, UV calibrated, and verified in control according to instrument-manufacturer specifications. For each color measurement, two samples of film were measured three times. The reported values are the average of the six measurements. Results are expressed in the CIE 1976 CIELAB color scale for Illuminant D65 and 10 degree observer.

Method for Determining $CO_2$ Permeability

Testing was done on samples of 20 mil thick films that were biaxially stretched (simultaneously) on a Brückner Karo IV machine at a rate of 350% to a 4×4 ratio at 100° C. 4 inch by 4 inch samples were cut from the biaxially stretched film and conditioned under nitrogen for three to four days. Measurement of the $CO_2$ permeability was done using a MOCON Permatran C-IV instrument (Mocon Inc., 7500 Boone Ave. North, Minneapolis, Minn. 55428, USA). Before measuring test samples, the sensor was calibrated using a known volume of $CO_2$. Each sample was conditioned under nitrogen for 3 hours before being exposed to $CO_2$. The films were tested at 30° C. and 0% relative humidity using dynamic accumulation mode. Carbon dioxide was supplied from a gas cylinder. The results listed are the average of two samples unless otherwise indicated.

Method for Determining $O_2$ Scavenging Capability

The oxygen scavenging performance of samples having oxygen scavenging capability was evaluated using oxygen uptake measurements obtained by means of an OxySense instrument (OxySense Inc., 1311 North Central Expressway, Suite 440 Dallas, Tex. 75243, USA). General principles of operation of the instrument are described in "An Exciting New Non-Invasive Technology for Measuring Oxygen in Sealed Packages the OxySense™ 101" D. Saini and M Desautel, in the Proceedings of Worldpak 2002, published by CRC Press, Boca Raton, Fla. (2002). The procedure used to evaluate the examples is described below.

Oxygen sensitive "OxyDots" supplied by OxySense Inc. were glued to the interior of Wheaton prescored 20 ml glass ampoules (Wheaton #176782) using a silicone adhesive. Approximately 2 gram samples of extruded film cut into strips were placed into the 20 ml ampoules. The stems of the ampoules were then sealed using standard glass blowing techniques. The oxygen content in gas phase in the ampoule was measured using the probe on the OxySense instrument to monitor the response of the OxyDot sealed in the ampoule. The instrument converts this reading to oxygen level in contact with the OxyDot. The sealed ampoules were then stored in an oven at 75° C. and the oxygen level in the headspace periodically monitored. The oxygen results are reported as mbars $O_2$.

Along with the data generated for the test samples in each experiment, two controls were monitored; a 0% oxygen control which involved charging an OxySense ampoule with about 25 grams of HPLC-grade water (Burdick and Jackson) (and about 0.8 grams of sodium sulfite to consume the oxygen present and to prevent bacterial growth), and a 21% oxygen control which was made by charging 5 grams of HPLC-grade water to an OxySense ampoule.

Calibration controls were sealed and calibrated to get a 0% and 21% control. All of the ampoules were measured by OxySense on the initial day, day "zero", before going into an oven at 75° C. On the days the samples were tested, they were taken out of the oven, allowed to come to room temperature in about 3 hours, and then tested.

Method for Determining UV Absorbance

The transmittance through films of ultraviolet and visible light from 200 nm to 800 nm was measured using an Agilent 8453 UV-Visible Spectrophotometer. Absorbance is calculated from transmittance using the equation: $\text{Abs} = -\log_{10}(I/I_0)$, where Abs=absorbance, I=measured transmitted light intensity, and $I_0$=initial light intensity, and $I/I_0$=transmittance.

Additives used in the Examples and Comparative Examples were either purchased or synthesized as indicated below.

Additive A 1,3-Benzenedicarboxamide, also known as isophthalamide (CAS #1740-57-4), was purchased from TCI America (9211 N. Harborgate Street, Portland, Oreg. 97203).

Additive B 2,6-Naphthalenedicarboxamide (CAS #46711-49-3) was prepared as follows. To a two liter three neck round-bottom flask fitted with a mechanical stirrer, addition funnel and condenser/Dean Stark apparatus, with a nitrogen inlet was charged 85.4 grams (0.35 mol) dimethyl 2,6-naphthalenedicarboxylate, 105.3 grams (2.34 mol) formamide, and 200 mls of anhydrous N,N-dimethylformamide. The flask contents were heated to 100 degrees C. under a nitrogen atmosphere and held for one hour. One hundred ml of a 25 wt. % solution of sodium methoxide in methanol was added through the addition funnel in four approximately equal portions. The flask contents were then heated for four hours at 100 degrees C. during which time methanol was being condensed and removed. The flask was cooled to room temperature and one liter of isopropyl alcohol was added in two 500 ml increments. After the resulting mixture was stirred for 15 minutes it was allowed to settle for one hour. Crystallized solid material was collected by filtration and air dried in the filter for 2 hours. The recovered off-white colored product weighed 112.7 grams. The solid was washed three times in deionized water and twice in methanol which yielded 71.4 grams of greater than 98% pure product. Melting point: 347-349 degrees C.; $^1$H NMR: This compound is insoluble in all common NMR solvents and only sparingly soluble in DMSO-d6. (DMSO-d6) δ 8.53 ppm (broad s), 8.21 ppm (broad s), 8.07 ppm (complex multi. from 8.09–8.00 ppm), 7.55 ppm (broad s), also 3.38 ppm (water), and 2.51 (DMSO); MS m/z 214 [M].

Additive C 1,4-Benzenedicarboxamide, also known as terephthalamide (CAS #3010-82-0), was purchased from TCI America (9211 N. Harborgate Street, Portland, Oreg. 97203).

Additive D

N,N'-bis(phenylmethyl)-2,6-naphthalenedicarboxamide was prepared as follows. To a three neck one liter round bottom flask fitted with distillation apparatus, a mechanical stirred and a thermal couple to control the temperature of the reaction by a heating mantle was charged 73.2 grams (0.30 mol) dimethyl-2,6-naphthalenedicarboxylate, 256.8 grams (2.4 mol) of benzylamine, and 0.96 grams of magnesium chloride hexahydrate. The reactants were heated to 150 degrees C. for 8 hours. During this period methanol was removed by distillation. Following the heating period the resulting solution was cooled to room temperature and 250 ml of methanol was added to the flask resulting in the precipitation of the product. The product was collected by filtration. The filter cake was washed twice with additional cold methanol. Following drying in a vacuum oven at 80° C. overnight, the product weighed 77.2 grams and was identified as being at least 98% pure by NMR. Melting point: 260-261 degrees C.; $^1$H NMR (DMSO-d6) δ 9.29 ppm (s, 2H), 8.56 ppm (s, 2H), 8.10 (complex multi., 4H), 7.40 ppm (complex multi., 8H), 4.57 ppm (s, 4H), 3.36 ppm (water), 2.51 ppm (DMSO); MS m/z 394 [M].

A search for a CAS number for Additive D was unsuccessful. The chemical structure is given below.

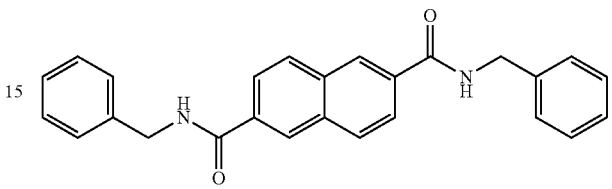

Additive E

N,N'-bis(phenylmethyl)-1,3-benzenedicarboxamide, also known as N,N'-dibenzylisophthalamide (CAS #41882-29-5) was prepared as follows. To a three neck, 3000 ml round-bottom flask, fitted with a nitrogen inlet, mechanical stirring apparatus, and a 250 ml addition funnel was charged one liter of dry methylene chloride and isophthaloyl dichloride (101.5 grams, 0.5 moles). The flask contents were cooled to 0° C. in an ice bath. Triethylamine (111 grams, 1.1 moles) was next charged to the flask. Benzylamine (116 grams, 1.08 moles) in 250 ml of dry methylene chloride was charged to the addition funnel and added drop-wise with stirring over a one hour period. After this addition, the ice bath was removed and the reaction mixture was allowed to return to room temperature with agitation continuing for an additional 7 hours. Precipitation of triethylammonium chloride was noted from the onset of benzylamine addition and continued to build during the first half of the reaction period. At the end of the reaction, the precipitate was removed by suction filtration through a thin Celite layer on the filter paper. The methylene chloride solution was extracted using 0.2 N hydrochloric acid, followed by a water extraction. After drying the organic layer over anhydrous magnesium sulfate, methylene chloride was removed by evaporation in vacuo. The remaining off-white solid weighing 79 grams (46% yield) was determined to be greater than 95% pure by NMR. This material was recrystallized from methanol giving colorless crystals: melting point 152-154° C. (literature melting point 156-158° C., J. Blum, A. Fisher, and E. Greener; Tetrahedron, 29, 1080 (1973)). $^1$H NMR (CDCl$_3$) δ 8.21 ppm (t, 1H aromatic, J=2.75 Hz), 7.93 ppm (dd, 2H, aromatic, J=2.75 and 8.22 Hz), 7.49 ppm (t, 1H, aromatic, J=8.22 Hz), 7.34-7.22 ppm (m, 10H, aromatic), 6.63 ppm, (t, 2H, NH, broad), 4.62 ppm (4H, benzylic, j=5.45 Hz); MS m/z 344 [M].

Additive F

N,N'-bis(phenylmethyl)-1,4-benzenedicarboxamide, also known as N,N'-dibenzylterephthalamide (CAS #15771-25-2) was prepared as follows. To a three neck 300 ml round bottom flask fitted with distillation apparatus, a mechanical stirring apparatus, and a thermal couple to control the temperature of the reaction by a heating mantle was charged 58.3 grams of dimethyl terephthalate, 160.7 grams (1.50 mol) of benzylamine, and 0.96 grams of magnesium chloride hexahydrate. The reactants were heated to 150 degrees C. for 8 hours. During this period methanol was removed by distillation and a white precipitate was formed. The reaction contents were allowed to cool overnight resulting in a white solid. The product was removed from the reaction flask and washed with approximately 500 mls of methanol at room temperature for two hours. Finally, the product was collected by filtration and air dried yielding 75.3 grams of product determined to be at least 98% pure by NMR. Melting point: 263-264 degrees C.; $^1$H NMR (DMSO d6) δ 9.20 (broad s, 2 N—H), 7.99 ppm (s, 4H aromatic), 7.35-7.23 (complex multi., 10H), 4.53 ppm (s, 4H benzylic), 3.36 ppm (water), 2.51 ppm (DMSO); MS m/z 344 [M].

Additive G

N,N',N''-tris(phenylmethyl)-1,3,5-benzenetricarboxamide, also known as N,N',N''-tribenzylbenzene-1,3,5-tricarboxamide (CAS #86375-10-2) was prepared as follows. To a three neck one liter round bottom flask fitted with distillation apparatus, a mechanical stirring apparatus, and a thermal couple to control the temperature of the reaction by a heating mantle was charged 50 grams (0.198 mol) of trimethyl-1,3,5-benzenetricarboxylate, 160.7 grams (1.50 mol) of benzylamine, and 0.64 grams of magnesium chloride hexahydrate. The reactants were heated to 150 degrees C. for 8 hours. During this period methanol was removed by distillation. Following the heating period the resulting solution was cooled to room temperature overnight yielding a white solid material. Approximately, 500 mls of methanol was added and the product was collected by vacuum filtration. The pasty product was transferred to a one liter round bottom flask and washed in 500 ml of methanol for two hours at room temperature. The product was once again collected by filtration and air dried yielding 47.8 grams of product determined to be at least 98% pure by NMR. Melting point: 235-237 degrees C.; $^1$H NMR (DMSO-d6) δ 9.27 ppm (broad s, 3N—H), 8.51 ppm (s, 3H), 7.35-7.25 ppm (complex multi., 18H), 3.33 ppm (water), 2.51 ppm (DMSO); MS m/z 477 [M].

Additive H

NjStar NU100®, N,N'-dicyclohexyl-2,6-naphthalene dicarboxamide (CAS #153250-52-3) was purchased from Rika International (C3 Brookside Business Park, Greengate, Middleton, Manchester, M24 1GS, United Kingdom)

Additive J

N,N'-bis(phenylmethyl)-1,6-hexanediamide, also known as N,N'-dibenzyl adipamide (CAS #25344-24-5) was prepared as follows. To a three neck, 3000 ml round-bottom flask, fitted with a nitrogen inlet, mechanical stirring apparatus, and a 250 ml addition funnel was charged 500 ml of dry methylene chloride and adipoyl chloride (100 grams, 0.55 moles). The flask contents were cooled to 0° C. in an ice bath. Pyridine (44 ml) and benzylamine (116 grams, 1.08 moles) were charged to the addition funnel and added drop-wise with stirring over a one hour period. Following this addition step, the ice bath was removed and the reaction mixture was allowed to return to room temperature with agitation continuing for one additional hour. Methylene chloride 600 ml was added to the reaction mixture and the mixture was heated to reflux for a brief period. Precipitation of pyridine hydrochloride was noted from the onset of benzylamine addition and continued to build during the first half of the reaction period. At the end of the reaction, the precipitate was removed by suction filtration. The methylene chloride solution was evaporated in vacuo to recover 9.2 grams of a brown colored oil which was discarded. The white collected precipitate was washed with 1.5 liters of water at room temperature, collected by filtration and air-dried, giving 149.9 grams of crude product. The product was recrystallized in methanol to give 100 grams (62% yield) of white crystalline material: melting point 187-190° C. (literature melting point 191-192° C. A. Rahman and M. O. Farooq; Chem. Ber. 86, 945 (1953)). $^1$H NMR (DMSO-d6) δ 8.30 ppm (t, 2H N—H, J=5.75 Hz), 7.34-7.18 ppm (m, 10H, aromatic), 4.25 ppm (4H, benzylic, J=5.95 Hz), 2.15 ppm (t, 4H carbonyl-CH$_2$—, J=6.40), 1.51 ppm (mult, 4H—CH$_2$—CH$_2$); MS m/z 324 [M].

Additive K

N,N'-[1,3-phenylenebis(methylene)]bisbenzamide, also known as N,N'-m-xylylenebis(benzamide) (CAS #33891-00-8) was prepared as follows. To a three neck three liter round bottom flask, fitted with a mechanical stirring apparatus, an addition funnel and a nitrogen inlet with bubbler for a reaction under a nitrogen atmosphere, was charged 68.1 grams (0.5 mol) of m-xylylenediamine, 146 mls of triethylamine (as a hydrochloric acid scavenger), and one liter of anhydrous methylene dichloride. The flask contents were agitated under a nitrogen atmosphere as the flask was cooled in ice water. The addition funnel was charged 123 ml (1.06 mol) of benzoyl chloride in 150 ml of methylene chloride, which was then added drop-wise over a period of approximately one hour to the flask contents. A precipitate formed during the addition of the acid chloride. At the completion of this step the ice bath was removed and the mixture was stirred for 4 hours. The mixture was filtered to remove all of the solids. After air drying of the solids which weighed 212 grams an NMR of the product indicated it to be a mixture of the desired diamide and triethylamine hydrochloride. This mixture was washed twice with methylene chloride in which triethylamine was found to be soluble to a certain degree and the diamide product insoluble. The remaining solid which weighed 109 grams was recrystallized in ethyl acetate which gave back 87.5 grams of product at least 98% pure by NMR. The product was dried overnight in a vacuum oven at 80 degrees C. Melting point: 173-175 degrees C.; NMR (CDCl$_3$) δ 7.79 ppm, 7.48 ppm, 7.41 ppm, 7.21 ppm (complex multi. 14H, aromatic), 6.56 broad s, 2 N—H), 4.61 ppm (benzylic 4H); MS m/z 344 [M].

Additive L

N,N'-[1,3-phenylenebis(methylene)]bis-benzeneacetamide (CAS #331987-08-7) was prepared as follows. To a three neck three liter round bottom flask, fitted with a mechanical stirring apparatus, an addition funnel and a nitrogen inlet with bubbler for a reaction under a nitrogen atmosphere, was charged 68.1 grams (0.5 mol) of m-xylylenediamine, 146 mls of triethylamine (as a hydrochloric acid scavenger), and one liter of anhydrous methylene dichloride. The flask contents were agitated under a nitrogen atmosphere as the flask was cooled in ice water. The addition funnel was charged with 139 ml (1.05 mol) phenylacetyl chloride in 125 ml of methylene chloride, which was then added drop-wise over a period of approximately one hour to the flask contents. A precipitate formed during the addition of the acid chloride. At the completion of this step the ice bath was removed and the mixture was stirred for 4 hours. The mixture was filtered to remove all of the solids. After air drying, the solids weighed 132.7 grams. The remaining solution was distilled under reduced pressure leaving a semi-solid which weighed 176.7 grams and was identified as primarily triethylamine hydrochloric acid salt and was discarded. Likewise, a fraction of the 132.7 grams was made up of the scavenger by-product. This material was dissolved in a 50/50 mixture of water and tetrahydrofuran and was allowed to recrystallize to give 53.1 grams of product. A second batch of crystals weighing 4.76 grams was recovered by addition of a small amount of ethyl acetate. The combined solids were finally recrystallized in 1250 mls of methanol, followed by drying in a vacuum oven overnight at 80 degrees C. to give 54.8 grams of product which was greater than 98% pure by NMR. Melting point: 196-197 degrees C.; $^1$H NMR (CDCl$_3$) δ 7.30-6.94 (complex aromatic multi., 14H), 5.70 ppm (broad s, 2 N—H), 4.36 ppm (s, 4H benzylic), 3.62 ppm (s, 4H benzylic); MS m/z 372 [M].

Additive M

N,N'-1,3-phenylenebisacetamide, also known as N,N'-m-phenylenebisacetamide or 1,3-diacetamidobenzene (CAS #10268-78-7) was prepared as follows. To a three neck one liter round bottom flask was charged 54.1 grams (0.5 mol) 1,3-phenylenediamine. The flask was fitted with a nitrogen inlet, a mechanical stirring device, and an addition funnel. The addition funnel was charged with 70 mls of acetic anhydride. A slight positive nitrogen pressure was applied and the flask was heated to 190° C. Once the 1,3-phenylenediamine became totally molten, acetic anhydride was added drop-wise. Refluxing was noted soon after the addition of acetic anhydride began. Refluxing was allowed to continue for two hours after addition of acetic anhydride was completed, at which time a solid had appeared. After an additional one hour heating period, the flask was allowed to cool to room temperature. Approximately, 400 mls of cold deionized water was added and a mechanical agitation was begun. The mixture was stirred overnight. A white solid was collected by vacuum filtration and allowed to air dry. The product weighed 60 grams (62% yield) and was greater than 95% purity by NMR. The product was characterized by proton NMR and parent ion mass spectroscopy. $^1$H-NMR (DMSO d-6) δ 9.92 ppm (s, 2H NH), 7.89 ppm (s, 1H, aromatic), 7.32-7.14 ppm (m 3H, aromatic), 2.04 ppm (s, 6H, $CH_3$); MS m/z 192 [M].

Additive N

N,N'-1,5-naphthalenediylbisacetamide, also known as 1,5-diacetamidonaphthalene (CAS #46874-40-2) was prepared as follows. To a one liter three neck round bottom flask fitted with a mechanical stirring apparatus, a nitrogen inlet, and an addition funnel was charged 47.5 grams (0.30 mol) 1,5-naphthalenediamine and 500 mls of anhydrous pyridine. The flask was cooled in an ice bath for 30 minutes at which time 64.3 grams (0.63 mol) acetic anhydride was added through the addition funnel drop wise, with agitation under a nitrogen atmosphere. The ice bath was then removed and the contents were allowed to warm to room temperature while remaining under nitrogen with agitation for 16 hours. The contents of the flask were poured into 2,000 grams of crushed ice. Once all the ice had melted, the remaining solids were collected by vacuum filtration. These solids were placed in a 3 liter round bottom flask with 2 liters of deionized water which was heated just below boiling for 16 hours. Solids were collected by vacuum filtration and air dried. The product was insoluble in all standard NMR solvents. Product identification was made by LC-MS. Product was determined to be greater than 95% pure with a yield of 49 grams (67%). MS m/z 242 [M].

Additive O

N,N'-1,3-phenylenebisbenzeneacetamide, also known as N,N'-m-phenylenebis(2-phenyl)acetamide (CAS #25256-35-3) was prepared as follows. To a two liter, three neck round bottom flask fitted with a mechanical stirrer, nitrogen inlet, and an addition funnel was charged 27.04 grams (0.25 mol) 1,3-phenylenediamine and one liter of anhydrous dimethylformamide. The mixture was stirred and the system was placed under a nitrogen atmosphere. An ice bath was placed under the round bottom flask which was cooled for 30 minutes before proceeding to the next step. Next, 90 mls triethylamine was added to the round bottom flask. The addition funnel was charged with 92.8 grams (0.60 mol) phenylacetyl chloride which was added drop-wise over a 60 minute period to the flask contents. The ice bath was next removed and the contents of the flask were stirred at room temperature for 16 hours. After this period, the contents of the flask were poured upon 2,000 grams of crushed ice. The ice was allowed to melt and the solids left from this procedure were collected by vacuum filtration. The solids were then recrystallized in methanol and collected by vacuum filtration. Upon air drying the product weighed 62.2 grams (72% yield) and was greater than 95% purity by NMR. The product was identified by proton NMR and parent ion mass spectroscopy. $^1$H-NMR (DMSO d-6) δ 10.19 ppm (s, 2 H NH), 7.99 ppm (s, 1H, aromatic), 7.44-7.18 ppm (m 13H, aromatic), 3.64 ppm (s, 4H, benzylic); MS m/z 344 [M].

Additive P

N,N'-1,5-naphthalenediylbisbenzeneacetamide (CAS #433326-56-8) was prepared as follows. To a two liter three neck round bottom flask, fitted with a mechanical stirring apparatus, a nitrogen inlet, and an addition funnel, was charged 47.5 grams (0.3 mol) 1,5-naphthalenediamine, 500 mls of anhydrous dichloromethane, and 63.6 grams (0.63 mol) triethylamine. The flask was cooled in an ice bath for 30 minutes. This was followed by addition of 97.4 grams (0.63 mol) phenylacetyl chloride in 100 mls dichloromethane drop-wise through the addition funnel over a one hour period. The ice bath was removed and the mixture was stirred under a nitrogen atmosphere for 16 hours. Solids were filtered by vacuum filtration. Dichloromethane was removed in vacuo from the filtrate. The solids from both procedures were combined and washed twice in 200 mls of warm water, with solids collected by vacuum filtration after each wash. The solids were finally air dried and the product was confirmed to be at least 95% pure by LC-MS. The product weighed 62 grams (54% yield); MS m/z 394 [M]. This additive was a yellow/brown color.

Additive Q

N,N'-pyridine-2,6-diyldiacetamide, also known as N,N'-2,6-pyridinediylbisacetamide (CAS #5441-02-1) was prepared as follows. To a three neck one liter round bottom flask was charged 54.6 grams (0.5 mol) pyridine-2,6-diamine. The flask was fitted with a nitrogen inlet and an addition funnel and a glass stopper. The addition funnel was charged with 70 mls of acetic anhydride. A slight positive nitrogen pressure was applied and the flask was heated to 190° C. Once the pyridine-2,6-diamine became totally molten acetic anhydride was added drop-wise. Refluxing was noted soon after the addition of acetic anhydride began. Refluxing was allowed to continue for two hours once addition of acetic anhydride was completed, at which time a solid had appeared. Heating was continued an additional hour, and then the flask was allowed to cool to room temperature. Approximately, 300 mls of cold deionized water/ice was added and a mechanical agitator was connected to the flask and the mixture was stirred overnight. A white solid was collected by vacuum filtration and allowed to air dry. No further purification was required for the product which weighed 96 grams (99% yield) and had greater than 95% purity by NMR. The product was characterized by proton NMR and parent ion mass spectroscopy. $^1$H-NMR (DMSO d-6) δ 10.07 ppm (s, 2H NH), 7.70 ppm (s, 3H, aromatic), 2.12 ppm (s, 6H, $CH_3$); MS m/z 193 [M].

Additive R

N,N'-1,5-naphthalenediylbiscyclohexanecarboxamide (CAS #162957-52-0) was prepared as follows. To a two liter three neck round bottom flask fitted with a mechanical stirring apparatus, a nitrogen inlet, and an addition funnel was charged 47.5 grams (0.3 mol) 1,5-naphthalenediamine and 500 ml anhydrous dichloromethane. This was followed by addition of 63.6 grams (0.63 mol) triethylamine. The flask contents were cooled for 30 minutes in an ice bath while being stirred under a nitrogen atmosphere. 92.3 grams cyclohexanecarbonyl chloride (0.63 mol) was charged to the addition funnel and added drop-wise over a one hour period to the flask. The ice bath was removed and the contents were stirred under a nitrogen atmosphere for 16 hours. Solids which had precipitated from the reaction were collected by vacuum filtration. The filtrate was stripped in vacuo. Solids from both procedures were combined and washed for two hours in warm deionized water (roughly 500 ml). Solids were once again collected by vacuum filtration and air dried. The product was not soluble in DMSO d-6 or $CDCl_3$. However, LC-MS confirmed that the majority of the mixture (approximately 90%) to be the desired diamide. Yield of the crude product was 97.2 grams (86%). The material was used as is without further purification. MS m/z 378 [M].

Additive S

Bis(2-methoxybenzyl)isophthaldiamide, also known as N,N'-bis[(2-methoxyphenyl)methyl]-1,3-benzenedicarboxamide (CAS #330466-55-2) was prepared as follows. To a 2,000 ml three neck round bottom flask fitted with a mechanical stirring apparatus, nitrogen inlet, and an addition funnel was added 34.5 grams (0.17 mol) isophthaloyl dichloride and one liter of anhydrous dichloromethane. The flask was placed under a very slight nitrogen pressure. Next the round bottom flask was placed in an ice water bath and agitation was begun. The flask was allowed to stand in this condition for 30 minutes at which time an addition funnel charged with 50 mls (0.19 mol) 2-methoxybenzylamine, 53 mls (0.38 mol) triethylamine, and 100 mls of anhydrous dichloromethane was placed on the round bottom flask, and the solution was added drop-wise over a one hour period. Following this step, the ice bath was removed and the flask content was allowed to stir at room temperature for 16 hours under a slight nitrogen pressure. A precipitate was formed during this procedure which was removed by vacuum filtration. The filter cake was washed with a small amount of cold dichloromethane and allowed to air dry. This material weighed 67.3 grams (97% yield) and was greater than 95% purity by NMR. The produce was characterized by proton NMR and parent ion mass spectroscopy. $^1$H-NMR ($CDCl_3$) δ 8.15 ppm (s, 1H aromatic), 7.89 ppm (d, 2H, aromatic, J=8 Hz), 7.45 ppm (t, 1H, aromatic, J=8 Hz), 7.36-7.24 ppm (m, 4H, aromatic), 6.97-6.87 ppm (m, 4H, aromatic) 6.75 ppm, (s, 2H, NH, broad), 4.64 ppm (d, 4H, benzylic, J=6 Hz), 3.88 ppm (s, 6H, OMe); MS m/z 404 [M].

Additive T

Bis(4-methoxybenzyl)isophthaldiamide, also known as N,N'-bis[4-methoxyphenyl)methyl]-1,3-benzenedicarboxamide (CAS #349396-68-5) was prepared as follows. To a 2,000 ml three neck round bottom flask fitted with a mechanical stirring apparatus, nitrogen inlet, and an addition funnel was added 34.5 grams (0.17 mol) isophthaloyl dichloride and one liter of anhydrous dichloromethane. The flask was placed under a very slight nitrogen pressure. Next the round bottom flask was placed in an ice water bath and agitation was begun. The flask was allowed to stand in this condition for 30 minutes at which time an addition funnel was charged with 50 mls (0.19 mol) 4-methoxybenzylamine, 53 mls (0.38 mol) triethylamine, and 100 mls of anhydrous dichloromethane, and the solution was added drop-wise over a one hour period. Following this step, the ice bath was removed and the flask content was allowed to stir at room temperature for 16 hours under a slight nitrogen pressure. A precipitate was formed during this procedure which was removed by vacuum filtration. The filter cake was washed with a small amount of cold dichloromethane and allowed to air dry. The product weighed 68 grams (99% yield) and was greater than 95% purity by NMR. The product was characterized by proton NMR and parent ion mass spectroscopy. $^1$H-NMR (DMSOd-6) δ 9.08 ppm (t, 2H NH, 5.84 Hz), 8.37 ppm (s, 1H, aromatic), 8.00 ppm (d, 2H, aromatic, J=7.78 Hz), 7.56 ppm (t, 1H, aromatic, 7.78 Hz), 7.26 ppm (d, 4H, aromatic, 7.78 Hz), 6.89 ppm (d, 4H, aromatic, 7.78 Hz), 4.43 ppm (d, 4H, benzylic, J=5.84 Hz), 3.72 ppm (s, 6H, OMe); MS m/z 404 [M].

Additive U

N,N'-1,3-phenylenebishexanamide, also known as N,N'-m-phenylenebishexanamide (CAS #25227-94-5) was prepared as follows. To a two liter three neck round bottom flask fitted with a mechanical stirrer, a nitrogen inlet, and an addition funnel was charged 35.1 grams (0.325 mol) 1,3-phenylenediamine, 100 mls triethylamine, and one liter of anhydrous dichloromethane. The flask was cooled in an ice water bath for one hour while a slight positive nitrogen pressure was applied through the inlet. 100 mls of hexanoyl chloride was charged drop-wise through a dry addition funnel over a 30 minute period. Following the addition of the acid chloride the ice bath was removed and the contents were stirred at room temperature under a nitrogen atmosphere for 16 hours. Solids were then recovered by vacuum filtration. Dichloromethane filtrate was removed in vacuo. Solids from both procedures were combined and washed three times with distilled water (100 mls each) with solids recovered by vacuum filtration after each wash. After the final wash the remaining solids were air dried and weighed 93 grams (96% yield). Proton NMR revealed purity of product to be greater than 95%. $^1$H-NMR ($CDCl_3$) δ 7.81 ppm (s, 1H aromatic), 7.45 ppm (s, 2H, NH broad), 7.34-7.18 ppm (m, 3H, aromatic), 2.32 ppm (t, 4H, 7.86 Hz, $CH_2$), 1.70 ppm (t, 4H, 7.86 Hz, $CH_2$) 1.39-1.27 ppm, (m, 8H, $CH_2$), 0.90 ppm (s, 6H, $CH_3$); MS m/z 304 [M].

Additive V

N,N'-[1,3-phenylenebis(methylene)]bishexanamide (CAS #548435-93-4) was prepared as follows. To a two liter three neck round bottom flask fitted with a mechanical stirrer, a nitrogen inlet, and an addition funnel was charged 44.27 grams (0.325 mol) m-xylylenediamine, 100 mls triethylamine, and one liter of anhydrous dichloromethane. The flask was cooled in an ice water bath for one hour while a slight positive nitrogen pressure was applied through the inlet. 100 mls of hexanoyl chloride was charged drop-wise through a dry addition funnel over a 30 minute period. Following the addition of the acid chloride, the ice bath was removed and the contents were stirred at room temperature under a nitrogen atmosphere for 16 hours. Solids were then recovered by vacuum filtration. Dichloromethane filtrate was removed in vacuo. Solids from both procedures were combined and washed three times with distilled water (100 mls each) with solids recovered by vacuum filtration after each wash. After the final wash the remaining solids were air dried and weighed 94 grams (87% yield). Proton NMR revealed purity of product to be at least 95%. $^1$H-NMR ($CDCl_3$) δ 7.34-7.12 ppm (m, 4H aromatic), 5.95 ppm (s, 2H, NH broad), 4.39 ppm (s, 4H, benzylic), 2.22 ppm (m, 4H, $CH_2$), 1.66 ppm (m, 4H, $CH_2$) 1.44-1.26 ppm, (m, 8H, $CH_2$), 0.90 ppm (s, 6H, $CH_3$); MS m/z 332 [M].

Additive W

Nylon-MXD6 grade 56007 (CAS #25718-70-1) was purchased from Mitsubishi Gas Chemical American, Inc. (655 Third Avenue, 24th Floor, New York, N.Y. 10017).

Additive X 1,2-Benzenedicarboxamide, also known as phthalamide (CAS #88-96-0), was purchased from TCI America (9211 N. Harborgate Street, Portland, Oreg. 97203).

Additive Y 1,2-Benzenedicarboxamide, N1,N2-bis(phenylmethyl)—also known as 1, 2 dibenzyl phthalamide (CAS #38228-99-8) was purchased from Sigma-Aldrich (St. Louis, Mo.).

Additive Z

N,N',N"-tris(phenylmethyl)-1,2,4-benzenetricarboxamide was prepared as follows. To a three neck one liter round bottom flask fitted with distillation apparatus, a mechanical stirring apparatus, and a thermal couple to control the temperature of the reaction by a heating mantle was charged 50 grams (0.198 mol) of trimethyl-1,2,4-benzenetricarboxylate, 160.7 grams (1.50 mol) of benzylamine, and 0.64 grams of magnesium chloride hexahydrate. The reactants were heated to 150 degrees C. for 24 hours. During this period methanol was removed by distillation. Following the heating period the solution was allowed to cool to room temperature yielding a white solid. Approximately, 500 mls of methanol was added and the product was collected by vacuum filtration. The product was transferred to a one liter round bottom flask and washed in 500 ml of methanol for two hours at room temperature. This washing procedure was repeated a second time. The product was once again collected by filtration and air dried yielding 69.5 grams of product determined to be at least 98% pure by NMR. Melting point: 216-217 degrees C.; $^1$H NMR (DMSO-d6) δ 9.22 ppm (broad s, 1 N—H), 8.89 ppm broad s, 2 N—H), 8.06 ppm (t, 1H), 7.66-7.20 ppm (complex multi., 14H aromatic), 4.45 ppm (multi. 3H benzylic), 3.32 ppm (water), 2.51 ppm (DMSO); MS m/z 477 [M].

A search for a CAS number for Additive Z was unsuccessful. The chemical structure is given below.

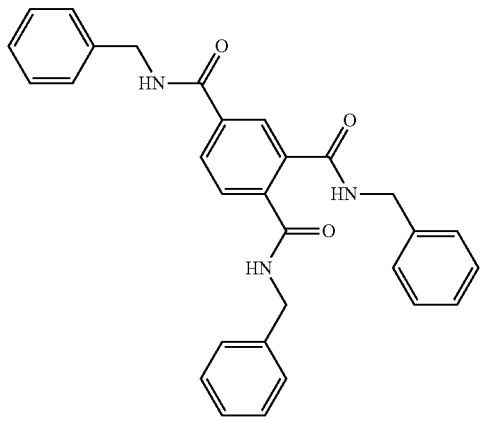 [SMILES: O=C(NCc1ccccc1)c1ccc(C(=O)NCc2ccccc2)c(C(=O)NCc2ccccc2)c1]

The base material used for making the films was ParaStar® 7000 PET resin available from Eastman Chemical Company (200 S. Wilcox Dr., Kingsport, Tenn. 37660). The PET resin was modified with 2.5 wt % isophthalic acid and was produced in the melt phase. The PET resin was the base resin for all examples and comparative examples.

Comparative Example C1

The PET resin described above was ground through a 3 mm screen and dried at 150° C. overnight. The dried resin was extruded into an approximately 20 mil thick film using a 1" Killion extruder (24:1 L:D). Extruder settings and measurements are given in Table 1. T1, T2, and T3 represent the three zone temperature set points. The Die Temperature and Screw Speed also represent set point values. The pressure represents the pressure within the barrel as measured right before the die. The Intrinsic viscosity (It.V.), glass transition temperature ($T_g$), color (L*, a*, and b*), haze, and carbon dioxide permeability ($P_{CO2}$) were measured as described herein above and are given in Table 2.

TABLE 1

Additive and Extruder Conditions

| Example | Additive | T1 (° C.) | T2 (° C.) | T3 (° C.) | Die Temp (° C.) | Screw speed (rpm) | Pressure (psig) |
|---|---|---|---|---|---|---|---|
| C1 | NA | 265 | 275 | 285 | 285 | 80 | 985 |
| 2 | A | 255 | 260 | 270 | 270 | 80 | 930 |
| 3 | B | 260 | 265 | 275 | 275 | 80 | 1020 |
| 4 | C | 255 | 265 | 280 | 280 | 80 | 440 |
| 5 | D | 265 | 275 | 285 | 285 | 80 | 790 |
| 6 | E | 270 | 270 | 280 | 285 | 80 | 290 |
| 7 | F | 265 | 275 | 285 | 285 | 80 | 690 |
| C8 | G | 265 | 275 | 285 | 285 | 80 | 830 |
| C9 | H | 265 | 275 | 285 | 275 | 80 | 1070 |
| C10 | J | 265 | 275 | 285 | 285 | 80 | 750 |
| C11 | K | 265 | 275 | 285 | 285 | 80 | 690 |
| C12 | L | 260 | 270 | 275 | 275 | 80 | 100 |

Example 2

The PET resin was ground through a 3 mm screen and dried at 150° C. overnight. Additive A was dried in a vacuum oven at 60° C. overnight. Blends of the dried materials were hand mixed prior to feeding to an extruder. The blend was extruded into approximately 20 mil film using a 1" Killion extruder (24:1 L:D). Extrusion conditions are given in Table 1. The target additive concentration was 2 wt. % based on the weight of the film. The actual weight percent of the additive (wt. % additive), Intrinsic Viscosity (It.V.), glass transition temperature ($T_g$), color (L*, a*, and b*), haze, and carbon dioxide permeability ($P_{CO2}$) were measured as described herein above and are given in Table 2.

Examples 3-7 and Comparative Examples C8-C12

Films were made and tested as Example 2 except that the Additive and extrusion conditions are as given in Table 1. Extrusion temperature set points were varied to maintain sufficient melt viscosity for film formation. All Additives were dried to remove water, generally between 35° C. and 100° C. depending upon the melting point of the Additive. Additives were typically dried overnight. All films were nominally 20 mil except Example 6 and Comparative Example 12 were each nominally 12 mil. The actual weight percent of the additive (wt. % additive), Intrinsic Viscosity (It.V.), glass transition temperature ($T_g$), color (L*, a*, and b*), haze, and carbon dioxide permeability ($P_{CO2}$) were measured as described herein above and are given in Table 2.

Additional Comparative Examples

Attempts were made to produce films from blends of the PET resin with Additive X, PET resin with Additive Y, and PET resin with Additive Z. Blends of each of these materials with the PET resin did not extrude into film and, therefore, no data was collected on these samples. These three additives have amide functionality in the ortho-position relative to each other on the aromatic ring. It is believed that these ortho-substituted amide groups undergo a ring closure reaction that produces byproducts which react with the polyester resin, causing viscosity degradation that led to the inability to extrude film.

TABLE 2

Film Characteristics and CO$_2$ Permeability

| Example | Additive | wt. % additive | It.V. (dL/g) | $T_g$ (°C.) | L* | a* | b* | Haze (%) | $P_{CO2}$ (cc-mil/100 in$^2$-day-atm) | ICP Co (ppm) |
|---|---|---|---|---|---|---|---|---|---|---|
| C1 | N/A | 0 | 0.813 | 82 | 94.48 | −0.07 | 0.5 | 0.81 | 32.5 | 3.4 |
| 2 | A | 1.37 | 0.723 | 78 | 94.36 | −0.23 | 0.76 | 0.59 | 25.7 | 3.1 |
| 3 | B | 1.76 | 0.757 | 80 | 93.98 | −0.24 | 0.91 | 1.79 | 28.9 | 3.6 |
| 4 | C | 1.64 | 0.719 | 79 | 91.28 | −0.09 | 3.29 | 44.6 | 31.0 | 3.2 |
| 5 | D | 1.67 | 0.736 | 80 | 93.9 | −0.11 | 0 | 0.53 | 28.8 | 85.0 |
| 6 | E | 1.41 | 0.703 | 78 | 95.28 | −0.01 | 0.18 | 0.38 | 31.0 | 96.3 |
| 7 | F | 0.96 | 0.746 | 79 | 94.15 | −0.1 | 0.12 | 0.65 | 31.5 | 67.0 |
| C8 | G | 1.59 | 0.737 | 81 | 93.81 | −0.09 | 0.09 | 0.54 | 31.3 | 88.9 |
| C9 | H | 2.24 | 0.791 | 81 | 93.74 | −0.13 | 1.06 | 11.2 | 39.8 | 3.4 |
| C10 | J | 1.90 | 0.715 | 76 | 93.4 | −0.04 | −0.51 | 0.78 | 30.0 | 78.0 |
| C11 | K | 2.15 | 0.696 | 77 | 94.54 | −0.04 | 0.04 | 0.44 | 27.1 | 93.7 |
| C12 | L | 2.00 | 0.73 | 77 | 93.84 | −0.16 | 0.09 | 0.59 | 28.4 | 89.4 |

One skilled in the art recognizes the importance of maintaining physical properties, such as mechanical strength and transparency, while simultaneously improving the gas barrier properties.

Examples 2-7 show no more than a 0.11 dL/g drop in Intrinsic Viscosity nor more than a 4° C. drop in $T_g$, while maintaining an L* above 90 and improving passive carbon dioxide barrier by 3 percent to 27 percent as compared to Comparative Example C1 with no Additive. The haze value for Example 4 is 44.6%. Example 4 showed heavy plate out when producing the film. Noting that the materials which cause the heavy plate out can be readsorbed onto the film surface, the heavy plate out is believed to be responsible for the high haze value due to contamination of the film surface with the plated-out material.

A cobalt concentrate was prepared by melt-blending 1.8 weight percent cobalt neodecanoate (sold as "22.5% TEN-CEM cobalt" by OMG Americas, Westlake, Ohio) with 98.2 weight percent Eastman Aqua® PET Pj003 available from Eastman Chemical Company (200 S. Wilcox Dr., Kingsport, Tenn. 37660). The blended material had an It.V. of 0.33 dL/g. The low It.V. for the cobalt concentrate is believed to be due to the fact that the PET was not dried before compounding to make the concentrate. As the concentrate was added at nominally 2 weight percent, the impact on the film It.V. is believed to be minimal. The cobalt level in the solid concentrate, as measured by Inductively Coupled Plasma Optical Emission Spectroscopy (ICP), was 4200 ppm.

Table 2 also lists the ICP results for the amount of cobalt (ppm) in each film. Cobalt was added, in the form of the concentrate described herein above and at a target amount of 100 ppm, to Examples 5-7 and Comparative Examples C8 and C10-C12. The low cobalt levels in the other Examples and Comparative Examples, approximately 3 ppm, is believed to be due to residual cobalt catalyst in the terephthalic acid fed to the polyester manufacturing process. The cobalt is not believed to have impacted the carbon dioxide permeability values shown in Table 2 as the testing was done soon after the film was made.

FIG. 1 shows the relative oxygen scavenging characteristics of film made with different additives and catalyzed with cobalt as well as two control samples, one at 0% oxygen and one at 21% oxygen. The partial pressure of the oxygen in the closed ampoule over time was measured as described herein above. Decreasing $P_{O2}$ with time is indicative of the consumption of oxygen by the sample. Examples 6 and 7 exhibited a reduction in $P_{O2}$ with time, thus indicating that the Additives of Examples 6 and 7 can act as oxygen scavenger additives in the presence of a transition metal catalyst. The Additives with a benzyl moiety are capable of undergoing oxidation in the presence of a transition metal catalyst, and thus acting as an oxygen scavenger additive.

The absorbance from 300 nm to 400 nm for films of neat ParaStar® 7000, Comparative Example 1 and films with naphthalene-based Additives, Examples 3 and 5 and Comparative Example 9, are shown in FIG. 2. The reported absorbance is normalized to a thickness of 1 mil. All three of the naphthalene-based additives result in increased absorbance of UV light with wavelengths in the range of 325 nm to 355 nm. Therefore, the Additives of Examples 3 and 5 could provide protection from UV radiation as well as improved barrier performance. One skilled in the art would recognize that the naphthalene-based Additives of the present invention would provide similar UV absorbance.

Another set of Additives were synthesized and formed into blends with The PET resin described herein above.

Comparative Example C13

Comparative Example C13 was made as described in Comparative Example C1, with no Additive. Extruder settings and measurements are given in Table 3. The Intrinsic Viscosity (It.V.), glass transition temperature ($T_g$), color (L*, a*, and b*), and haze are given in Table 4. Carbon dioxide permeability was not measured on this sample.

TABLE 3

Additive and Extruder Conditions

| Example | Additive | T1 (° C.) | T2 (° C.) | T3 (° C.) | Die Temp (° C.) | Screw speed (rpm) | Pressure (psig) |
|---|---|---|---|---|---|---|---|
| C13 | NA | 265 | 275 | 285 | 285 | 80 | 1100 |
| 14 | M | 260 | 265 | 270 | 275 | 80 | 1085 |
| 15 | N | 250 | 260 | 260 | 275 | 80 | 810 |
| 16 | O | 260 | 265 | 270 | 275 | 80 | 1180 |
| 17 | P | 255 | 265 | 275 | 275 | 80 | 1080 |
| C18 | Q | 260 | 265 | 270 | 275 | 80 | 1370 |
| C19 | R | 265 | 275 | 280 | 285 | 80 | 940 |
| C20 | S | 260 | 265 | 270 | 275 | 80 | 1040 |
| C21 | T | 260 | 265 | 270 | 275 | 80 | 840 |
| C22 | U | 255 | 260 | 260 | 270 | 80 | 1040 |
| C23 | V | 255 | 260 | 260 | 270 | 80 | 560 |
| C24 | W | 260 | 270 | 275 | 275 | 80 | 900 |

Examples 14-17 and Comparative Examples C18-C24

Films were made and tested as Example 2 except that the Additive and extrusion conditions were a given in Table 3. The Additive used, the actual weight percent of the Additive (wt. % additive), Intrinsic Viscosity (It.V.), glass transition temperature ($T_g$), color (L*, a*, and b*), haze, and carbon dioxide permeability ($P_{CO2}$) are given in Table 4.

TABLE 4

Film Characteristics and $CO_2$ Permeability

| Example | Additive | wt. % additive | It.V. (dL/g) | $T_g$ (°C.) | L* | a* | b* | Haze (%) | $P_{CO2}$ (cc-mil/100 in²-day-atm) |
|---|---|---|---|---|---|---|---|---|---|
| C13 | none | NA | 0.71 | 80 | 94.47 | −0.13 | 0.44 | 1.52 | NA |
| 14(a) | M | 1.40 | 0.717 | 77 | 93.32 | −0.51 | 2.19 | 23.40 | 23.0 |
| 14(b) | M | NA | NA | NA | 94.76 | −0.32 | 1.38 | 1.86 | NA |
| 15 | N | 1.39 | 0.685 | 78 | 88.24 | 0.62 | 9.44 | 5.84 | 25.2[1] |
| 16 | O | 1.65 | 0.688 | 77 | 94.74 | −0.52 | 1.57 | 1.89 | 30.9 |
| 17(a) | P | 1.20 | 0.719 | 79 | 86.94 | −3.10 | 32.00 | 2.82 | 30.7 |
| 17(b) | P | NA | NA | NA | 75 | 11.04 | 40 | 4.28 | NA |
| C18 | Q | 0.90 | 0.712 | 78 | 92.16 | −0.55 | 2.32 | 14.90 | 29.9 |
| C19 | R | 1.24 | 0.672 | 79 | 91.79 | 0.52 | 5.56 | 4.43 | NA |
| C20 | S | 2.40 | 0.627 | 77 | 93.86 | −0.13 | 0.39 | 1.84 | 28.0 |
| C21 | T | 1.29 | 0.633 | 78 | 94.03 | −0.04 | 0.01 | 1.69 | 29.8 |
| C22 | U | 1.45 | 0.707 | 77 | 94.60 | −0.32 | 0.96 | 3.33 | 31.8 |
| C23 | V | 1.43 | 0.579 | 75 | 93.47 | −0.15 | −0.45 | 2.56 | 29.7 |
| C24 | W | 1.17 | 0.669 | 80 | 93.84 | −0.04 | −0.29 | 1.97 | 27.6 |

[1]The two measurements of $CO_2$ permeability for Example 15 films were 25.2 and 46.9 cc-mil/100 in²-day-atm. The high second number indicates a leak in the film and was not used to give an average of two readings for this sample.

Examples 14-17 show no more than a 0.03 dL/g drop in Intrinsic Viscosity nor more than a 3° C. drop in $T_g$, while maintaining an L* above 75 as compared to Comparative Example C1 with no Additive. The film of Example 14 was variable in appearance due to sticking to the roll during manufacture. The haze value for part of the film, Example 14(a), is 23.4%. The color and haze values were re-evaluated using a different section of the film, where material causing plate out had not readsorbed onto the film, and are shown as Example 14(b) with a haze value of 1.9%. Example 17 had an unexpectedly high b*, yellow appearance; b* value of Example 17(a) is 32. The color measurement was re-evaluated which confirmed the high b* value; b* value of Example 17(b) is 42. The color of Example 17 is believed to be high because Additive P had a noticeable yellow/brown color and Additive P was not further purified before use. Carbon dioxide permeability testing was not performed on the film without Additives, Comparative Example C13. Carbon dioxide permeability testing was not performed on Comparative Example C19 because the condition of the film, its roughness and the presence of specks, caused concern that the proper seal (e.g., lack of pinhole leaks) required for meaningful results could not be assured.

The cobalt concentrate was added to Comparative Examples C20, C21, C23, and C24 to produce a target composition with 100 ppm cobalt. Cobalt was not added to Example 16 nor Example 17 which have benzylic substituents and would be expected to have oxygen scavenging capability. The cobalt added to some of the Comparative Examples is not believed to impact the carbon dioxide permeability values shown in Table 4 as the testing was done soon after the film was made.

We claim:

1. A polyester polymer composition comprising:
    at least one polyethylene terephthalate polyester in an amount ranging from 94.0 weight percent to 99.5 weight percent and
    at least one additive in an amount ranging from 0.5 weight percent to 6.0 weight percent, each based on the total weight of the polyester composition,
    wherein the at least one additive is

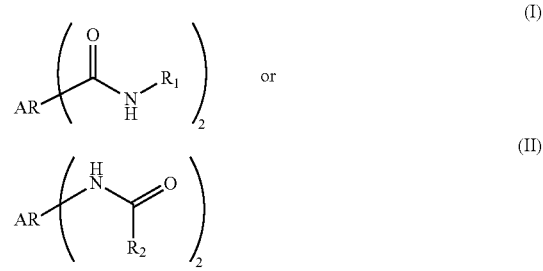

wherein AR is selected from the group consisting of phenylene ($C_6H_4$) and naphthylene ($C_{10}H_6$),
$R_1$ is selected from the group consisting of hydrogen (H), methyl ($CH_3$), ethyl ($CH_2CH_3$), phenyl ($C_6H_5$), and benzyl ($CH_2C_6H_5$),
$R_2$ is selected from the group consisting of methyl ($CH_3$), ethyl ($CH_2CH_3$), phenyl ($C_6H_5$), and benzyl ($CH_2C_6H_5$),
and wherein when AR is phenylene ($C_6H_4$), the substituents, $R_1$ or $R_2$, are located in the meta or para position relative to each other and when AR is naphthylene ($C_{10}H_6$), the substituents, $R_1$ or $R_2$, are located in the 1,3; 1,4; 1,5; 1,6; 1,7; 2,6; or 2,7 position relative to each other.

2. The polyester composition of claim 1, wherein the at least one polyethylene terephthalate polyester comprises:
    (a) a dicarboxylic acid component comprising at least 90 mole percent of the residues of terephthalic acid and
    (b) a hydroxyl component comprising at least 90 mole percent of the residues of ethylene glycol,
    based on 100 mole percent of dicarboxylic acid component residues and 100 mole percent of hydroxyl component residues in the at least one polyethylene terephthalate polyester.

3. The polyester composition of claim 1, wherein the at least one polyethylene terephthalate polyester has an Intrinsic Viscosity (It.V.) in the range of 0.70 dL/g to 1.2 dL/g as measured at 25° C. in a 0.50 g polyester/100 mL of 60 wt. % phenol and 40 wt. % 1,1,2,2-tetrachloroethane solvent.

4. The polyester composition of claim 1, wherein when AR is naphthylene ($C_{10}H_6$), the substituents, $R_1$ or $R_2$, are located in the 1,3; 1,5; 1,6; or 2,6 position relative to each other.

5. The polyester composition of claim 1, wherein when AR is naphthylene ($C_{10}H_6$), the substituents, $R_1$ or $R_2$, are located in the 1,5; or 2,6 position relative to each other.

6. The polyester composition of claim 1, wherein when AR is naphthylene ($C_{10}H_6$), the substituents, $R_1$ or $R_2$, are located in the 1,3 position relative to each other.

7. The polyester composition of claim 1, wherein the at least one additive is chosen from one or more of isophthalamide, 2,6-naphthalenedicarboxamide, terephthalamide, N,N'-bis(phenylmethyl)-2,6-naphthalenedicarboxamide, N,N'-bis(phenylmethyl)-1,3-benzenedicarboxamide, N,N'-bis(phenylmethyl)-1,4-benzenedicarboxamide, N,N'-1,3-phenylenebisacetamide, N,N'-1,5-naphthalenediylbisacetamide, N,N'-1,3-phenylenebisbenzeneacetamide, and N,N'-1,5-naphthalenediylbisbenzeneacetamide.

8. The polyester composition of claim 1, wherein the at least one additive is in an amount ranging from 0.5 weight percent to 2.5 weight percent, based on the total weight of the polyester composition.

9. The polyester composition of claim 1, wherein the polyester composition has a $T_g$ of at least 77° C.

10. The polyester composition of claim 1, wherein the difference between the It.V. of the at least one polyethylene terephthalate polyester and the polyester composition, each as measured at 25° C. in a 0.50 g polyester/100 mL of 60 wt. % phenol and 40 wt. % 1,1,2,2-tetrachloroethane solvent, is less than 0.1 dL/g.

11. The polyester composition of claim 1, wherein the difference between the $T_g$ of the at least one polyethylene terephthalate polyester and the polyester composition is less than 5° C.

12. The polyester composition of claim 1, wherein the polyester composition in the form of a 20 mil thick film has an L* greater than 85, a b* in the range of −1 to 2, and a haze value less than 4 percent.

13. The polyester composition of claim 1, wherein AR is naphthylene ($C_{10}H_6$) and the polyester composition has an absorbance normalized to a 1 mil film greater than 0.1 for ultra-violet light in a range of 320 nm to 355 nm.

14. The polyester composition of claim 1, wherein $R_1$ or $R_2$ is benzyl, further comprising one or more transition metal chosen from cobalt, manganese, nickel, copper, rhodium, and ruthenium.

15. The polyester composition of claim 14, comprising cobalt.

16. A polyester polymer composition comprising:
   at least one polyethylene terephthalate polyester in an amount ranging from 94.0 weight percent to 99.5 weight percent and
   at least one additive in an amount ranging from 0.5 weight percent to 6.0 weight percent, each based on the total weight of the polyester composition,
   wherein the at least one additive is

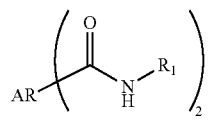

(I)

wherein AR is selected from the group consisting of phenylene ($C_6H_4$) and naphthylene ($C_{10}H_6$),
$R_1$ is selected from the group consisting of hydrogen (H), methyl ($CH_3$), ethyl ($CH_2CH_3$), phenyl ($C_6H_5$), and benzyl ($CH_2C_6H_5$),
and wherein when AR is phenylene ($C_6H_4$), the substituents, $R_1$, are located in the meta or para position relative to each other and when AR is naphthylene ($C_{10}H_6$), the substituents, $R_1$, are located in the 1,3; 1,4; 1,5; 1,6; 1,7; 2,6; or 2,7 position relative to each other.

17. The polyester composition of claim 16, wherein the at least one polyethylene terephthalate polyester comprises:
   (a) a dicarboxylic acid component comprising at least 90 mole percent of the residues of terephthalic acid and
   (b) a hydroxyl component comprising at least 90 mole percent of the residues of ethylene glycol,
based on 100 mole percent of dicarboxylic acid component residues and 100 mole percent of hydroxyl component residues in the at least one polyethylene terephthalate polyester.

18. The polyester composition of claim 16, wherein the at least one polyethylene terephthalate polyester has an Intrinsic Viscosity (It.V.) in the range of 0.70 dL/g to 1.2 dL/g as measured at 25° C. in a 0.50 g polyester/100 mL of 60 wt. % phenol and 40 wt. % 1,1,2,2-tetrachloroethane solvent.

19. The polyester composition of claim 16, wherein when AR is naphthylene ($C_{10}H_6$), the substituents, $R_1$, are located in the 1,3; 1,5; 1,6; or 2,6 position relative to each other.

20. The polyester composition of claim 16, wherein when AR is naphthylene ($C_{10}H_6$), the substituents, $R_1$, are located in the 1,5; or 2,6 position relative to each other.

21. The polyester composition of claim 16, wherein when AR is naphthylene ($C_{10}H_6$), the substituents, $R_1$, are located in the 1,3 position relative to each other.

22. The polyester composition of claim 16, wherein the at least one additive is chosen from one or more of isophthalamide, 2,6-naphthalenedicarboxamide, terephthalamide, N,N'-bis(phenylmethyl)-2,6-naphthalenedicarboxamide, N,N'-bis(phenylmethyl)-1,3-benzenedicarboxamide, and N,N'-bis(phenylmethyl)-1,4-benzenedicarboxamide.

23. The polyester composition of claim 16, wherein the at least one additive is in an amount ranging from 0.5 weight percent to 2.5 weight percent.

24. The polyester composition of claim 16, wherein the polyester composition has a $T_g$ of at least 77° C.

25. The polyester composition of claim 16, wherein the difference between the It.V. of the at least one polyethylene terephthalate polyester and the polyester composition, each as measured at 25° C. in a 0.50 g polyester/100 mL of 60 wt. % phenol and 40 wt. % 1,1,2,2-tetrachloroethane solvent, is less than 0.1 dL/g.

26. The polyester composition of claim 16, wherein the difference between the $T_g$ of the at least one polyethylene terephthalate polyester and the polyester composition is less than 5° C.

27. The polyester composition of claim 16, wherein the polyester composition in the form of a 20 mil thick film has an L* greater than 85, a b* in the range of −1 to 2, and a haze value less than 4 percent.

28. The polyester composition of claim 16, wherein AR is naphthylene ($C_{10}H_6$) and the polyester composition has an absorbance normalized to a 1 mil film greater than 0.1 for ultra-violet light in a range of 320 nm to 355 nm.

29. The polyester composition of claim 16, further comprising one or more transition metal chosen from cobalt, manganese, nickel, copper, rhodium, and ruthenium.

30. The polyester composition of claim 29, comprising cobalt.

31. A polyester polymer composition comprising:
at least one polyethylene terephthalate polyester in an amount ranging from 94.0 weight percent to 99.5 weight percent and
at least one additive in an amount ranging from 0.5 weight percent to 6.0 weight percent, each based on the total weight of the polyester composition,
wherein the at least one additive is

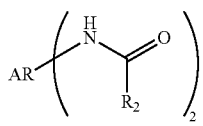 (II)

wherein AR is selected from the group consisting of phenylene ($C_6H_4$) and naphthylene ($C_{10}H_6$),
$R_2$ is selected from the group consisting of methyl ($CH_3$), ethyl ($CH_2CH_3$), phenyl ($C_6H_5$), and benzyl ($CH_2C_6H_5$),
and wherein when AR is phenylene ($C_6H_4$), the substituents, $R_2$, are located in the meta or para position relative to each other and when AR is naphthylene ($C_{10}H_6$), the substituents, $R_2$, are located in the 1,3; 1,4; 1,5; 1,6; 1,7; 2,6; or 2,7 position relative to each other.

32. The polyester composition of claim 31, wherein the at least one polyethylene terephthalate polyester comprises:
(a) a dicarboxylic acid component comprising at least 90 mole percent of the residues of terephthalic acid and
(b) a hydroxyl component comprising at least 90 mole percent of the residues of ethylene glycol,
based on 100 mole percent of dicarboxylic acid component residues and 100 mole percent of hydroxyl component residues in the at least one polyethylene terephthalate polyester.

33. The polyester composition of claim 31, wherein the at least one polyethylene terephthalate polyester has an Intrinsic Viscosity (It.V.) in the range of 0.70 dL/g to 1.2 dL/g as measured at 25° C. in a 0.50 g polyester/100 mL of 60 wt. % phenol and 40 wt. % 1,1,2,2-tetrachloroethane solvent.

34. The polyester composition of claim 31, wherein when AR is naphthylene ($C_{10}H_6$), the substituents, $R_2$, are located in the 1,3; 1,5; 1,6; or 2,6 position relative to each other.

35. The polyester composition of claim 31, wherein when AR is naphthylene ($C_{10}H_6$), the substituents, $R_2$, are located in the 1,5; or 2,6 position relative to each other.

36. The polyester composition of claim 31, wherein when AR is naphthylene ($C_{10}H_6$), the substituents, $R_2$, are located in the 1,3 position relative to each other.

37. The polyester composition of claim 31, wherein the at least one additive is chosen from one or more of N,N'-1,3-phenylenebisacetamide, N,N'-1,5-naphthalenediylbisacetamide, N,N'-1,3-phenylenebisbenzeneacetamide, and N,N'-1,5-naphthalenediylbisbenzeneacetamide.

38. The polyester composition of claim 31, wherein the at least one additive is in an amount ranging from 0.5 weight percent to 2.5 weight percent.

39. The polyester composition of claim 31, wherein the polyester composition has a $T_g$ of at least 77° C.

40. The polyester composition of claim 31, wherein the difference between the It.V. of the at least one polyethylene terephthalate polyester and the polyester composition, each as measured at 25° C. in a 0.50 g polyester/100 mL of 60 wt. % phenol and 40 wt. % 1,1,2,2-tetrachloroethane solvent, is less than 0.1 dL/g.

41. The polyester composition of claim 31, wherein the difference between the $T_g$ of the at least one polyethylene terephthalate polyester and the polyester composition is less than 5° C.

42. The polyester composition of claim 31, wherein the polyester composition in the form of a 20 mil thick film has an L* greater than 85, a b* in the range of −1 to 2, and a haze value less than 4 percent.

43. The polyester composition of claim 31, wherein AR is naphthylene ($C_{10}H_6$) and the polyester composition has an absorbance normalized to a 1 mil film greater than 0.1 for ultra-violet light in a range of 320 nm to 355 nm.

44. The polyester composition of claim 31, further comprising one or more transition metal chosen from cobalt, manganese, nickel, copper, rhodium, and ruthenium.

45. The polyester composition of claim 44, comprising cobalt.

46. A process for making a polyester polymer composition comprising:
(a) feeding at least one polyethylene terephthalate polyester to an extruder;
(b) feeding at least one additive to the extruder, wherein the at least one additive comprises:

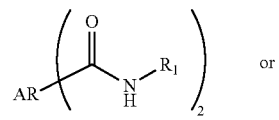 (I) or

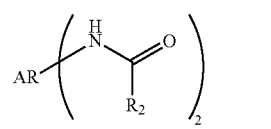 (II)

wherein AR is selected from the group consisting of phenylene ($C_6H_4$) and naphthylene ($C_{10}H_6$),
$R_1$ is selected from the group consisting of hydrogen (H), methyl ($CH_3$), ethyl ($CH_2CH_3$), phenyl ($C_6H_5$), and benzyl ($CH_2C_6H_5$),
$R_2$ is selected from the group consisting of methyl ($CH_3$), ethyl ($CH_2CH_3$), phenyl ($C_6H_5$), and benzyl ($CH_2C_6H_5$),
and wherein when AR is phenylene ($C_6H_4$), the substituents, $R_1$ or $R_2$, are located in the meta or para position relative to each other and when AR is naphthylene ($C_{10}H_6$), the substituents, $R_1$ or $R_2$, are located in the 1,3; 1,4; 1,5; 1,6; 1,7; 2,6; or 2,7 position relative to each other;
(c) melt blending the at least one polyethylene terephthalate polyester and the at least one additive to form the polyester composition, wherein the amount of the at least one polyethylene terephthalate polyester is in the range of 94.0 weight percent to 99.5 weight percent and the at least one additive is in the range of 0.5 weight percent to 6.0 weight percent, each based on the total weight of the polyester composition.

47. The process of claim 46, wherein the at least one polyethylene terephthalate polyester comprises:
   (a) a dicarboxylic acid component comprising at least 90 mole percent of the residues of terephthalic acid and
   (b) a hydroxyl component comprising at least 90 mole percent of the residues of ethylene glycol,
based on 100 mole percent of dicarboxylic acid component residues and 100 mole percent of hydroxyl component residues in the at least one polyethylene terephthalate polyester.

48. The process of claim 46, wherein the at least one polyethylene terephthalate polyester has an Intrinsic Viscosity (It.V.) in the range of 0.70 dL/g to 1.2 dL/g as measured at 25° C. in a 0.50 g polyester/100 mL of 60 wt. % phenol and 40 wt. % 1,1,2,2-tetrachloroethane solvent.

49. The process of claim 46, wherein the at least one additive is in an amount ranging from 0.5 weight percent to 2.5 weight percent.

50. The process of claim 46, wherein the polyester composition has an Intrinsic Viscosity (It.V.) in the range of 0.70 dL/g to 1.2 dL/g as measured at 25° C. in a 0.50 g polyester/100 mL of 60 wt. % phenol and 40 wt. % 1,1,2,2-tetrachloroethane solvent.

51. The process of claim 46, wherein the polyester composition has a $T_g$ of at least 77° C.

52. The process of claim 46, wherein polyester composition in the form of a 20 mil thick film has an L* greater than 85, a b* in the range of −1 to 2, and a haze value less than 4 percent.

53. The process of claim 46, wherein the at least one polyethylene terephthalate and the at least one additive are premixed and fed to the extruder as one stream.

54. The process of claim 46, wherein the at least one additive is fed to the extruder in the form of an additive concentrate.

55. The process of claim 46, wherein the at least one additive is chosen from one or more of isophthalamide, 2,6-naphthalenedicarboxamide, terephthalamide, N,N'-bis(phenylmethyl)-2,6-naphthalenedicarboxamide, N,N'-bis(phenylmethyl)-1,3-benzenedicarboxamide, N,N'-bis(phenylmethyl)-1,4-benzenedicarboxamide, N,N'-1,3-phenylenebisacetamide, N,N'-1,5-naphthalenediylbisacetamide, N,N'-1,3-phenylenebisbenzeneacetamide, and N,N'-1,5-naphthalenediylbisbenzeneacetamide.

56. The process of claim 55, wherein the at least one additive is chosen from one or more of isophthalamide, 2,6-naphthalenedicarboxamide, terephthalamide, N,N'-bis(phenylmethyl)-2,6-naphthalenedicarboxamide, N,N'-bis(phenylmethyl)-1,3-benzenedicarboxamide, and N,N'-bis(phenylmethyl)-1,4-benzenedicarboxamide.

57. The process of claim 55, wherein the at least one additive is chosen from one or more of N,N'-1,3-phenylenebisacetamide, N,N'-1,5-naphthalenediylbisacetamide, N,N'-1,3-phenylenebisbenzeneacetamide, and N,N'-1,5-naphthalenediylbisbenzeneacetamide.

58. The process of claim 46, wherein $R_1$ or $R_2$ is benzyl, further comprising adding one or more transition metal chosen from cobalt, manganese, nickel, copper, rhodium, and ruthenium.

59. The process of claim 58, wherein the transition metal comprises cobalt.

60. The process of claim 58, wherein the transition metal is fed to the extruder in the form of a transition metal concentrate.

61. An article comprising a polyester polymer composition comprising:
   at least one polyethylene terephthalate polyester in an amount ranging from 94.0 weight percent to 99.5 weight percent and
   at least one additive in an amount ranging from 0.5 weight percent to 6.0 weight percent, each based on the total weight of the polyester composition,
   wherein the at least one additive is

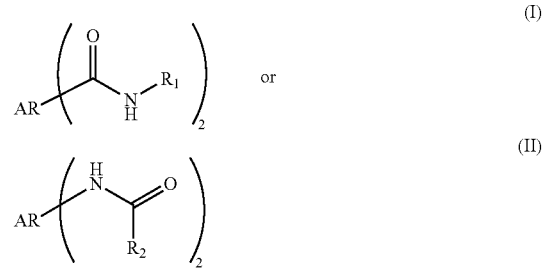

wherein AR is selected from the group consisting of phenylene ($C_6H_4$) and naphthylene ($C_{10}H_6$),
$R_1$ is selected from the group consisting of hydrogen (H), methyl ($CH_3$), ethyl ($CH_2CH_3$), phenyl ($C_6H_5$), and benzyl ($CH_2C_6H_5$),
$R_2$ is selected from the group consisting of methyl ($CH_3$), ethyl ($CH_2CH_3$), phenyl ($C_6H_5$), and benzyl ($CH_2C_6H_5$),
and wherein when AR is phenylene ($C_6H_4$), the substituents, $R_1$ or $R_2$, are located in the meta or para position relative to each other and when AR is naphthylene ($C_{10}H_6$), the substituents, $R_1$ or $R_2$, are located in the 1,3; 1,4; 1,5; 1,6; 1,7; 2,6; or 2,7 position relative to each other.

62. The article of claim 61, wherein the at least one polyethylene terephthalate polyester comprises:
   (a) a dicarboxylic acid component comprising at least 90 mole percent of the residues of terephthalic acid and
   (b) a hydroxyl component comprising at least 90 mole percent of the residues of ethylene glycol,
based on 100 mole percent of dicarboxylic acid component residues and 100 mole percent of hydroxyl component residues in the at least one polyethylene terephthalate polyester.

63. The article of claim 61, wherein the at least one polyethylene terephthalate polyester has an Intrinsic Viscosity (It.V.) in the range of 0.70 dL/g to 1.2 dL/g as measured at 25° C. in a 0.50 g polyester/100 mL of 60 wt. % phenol and 40 wt. % 1,1,2,2-tetrachloroethane solvent.

64. The article of claim 61, wherein the at least one additive is in an amount ranging from 0.5 weight percent to 2.5 weight percent.

65. The article of claim 61, wherein the article has an Intrinsic Viscosity (It.V.) in the range of 0.70 dL/g to 1.2 dL/g as measured at 25° C. in a 0.50 g polyester/100 mL of 60 wt. % phenol and 40 wt. % 1,1,2,2-tetrachloroethane solvent.

66. The article of claim 61, wherein the article has a $T_g$ of at least 77° C.

67. The article of claim 61, wherein the article is in the form of a 20 mil thick film having an L* greater than 85, a b* in the range of −1 to 2, and a haze value less than 4 percent.

68. The article of claim 61, wherein the article is a bottle preform.

69. The article of claim 61, wherein the article is a bottle.

70. The article of claim 61, wherein the at least one additive is chosen from one or more of isophthalamide, 2,6-naphthalenedicarboxamide, terephthalamide, N,N'-bis(phenylmethyl)-2,6-naphthalenedicarboxamide, N,N'-bis(phenylmethyl)-1,3-benzenedicarboxamide, N,N'-bis(phenylmethyl)-1,4-benzenedicarboxamide, N,N'-1,3-phenylenebisacetamide, N,N'-1,5-naphthalenediylbisacetamide, N,N'-1,3-phenylenebisbenzeneacetamide, and N,N'-1,5-naphthalenediylbisbenzeneacetamide.

71. The article of claim 70, wherein the at least one additive is chosen from one or more of isophthalamide, 2,6-naphthalenedicarboxamide, terephthalamide, N,N'-bis(phenylmethyl)-2,6-naphthalenedicarboxamide, N,N'-bis(phenylmethyl)-1,3-benzenedicarboxamide, and N,N'-bis(phenylmethyl)-1,4-benzenedicarboxamide.

72. The article of claim 70, wherein the at least one additive is chosen from one or more of N,N'-1,3-phenylenebisacetamide, N,N'-1,5-naphthalenediylbisacetamide, N,N'-1,3-phenylenebisbenzeneacetamide, and N,N'-1,5-naphthalenediylbisbenzeneacetamide.

73. The article of claim 61, further comprising one or more transition metal chosen from cobalt, manganese, nickel, copper, rhodium, and ruthenium.

74. The article of claim 73, comprising cobalt.

75. A process for making an article comprising:
(a) feeding at least one polyethylene terephthalate polyester to an extruder;
(b) feeding at least one additive to the extruder, wherein the at least one additive comprises:

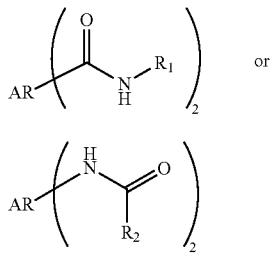

wherein AR is selected from the group consisting of phenylene ($C_6H_4$) and naphthylene ($C_{10}H_6$),
$R_1$ is selected from the group consisting of hydrogen (H), methyl ($CH_3$), ethyl ($CH_2CH_3$), phenyl ($C_6H_5$), and benzyl ($CH_2C_6H_5$),
$R_2$ is selected from the group consisting of methyl ($CH_3$), ethyl ($CH_2CH_3$), phenyl ($C_6H_5$), and benzyl ($CH_2C_6H_5$),
and wherein when AR is phenylene ($C_6H_4$), the substituents, $R_1$ or $R_2$, are located in the meta or para position relative to each other and when AR is naphthylene ($C_{10}H_6$), the substituents, $R_1$ or $R_2$, are located in the 1,3; 1,4; 1,5; 1,6; 1,7; 2,6; or 2,7 position relative to each other;
(c) melt blending the at least one polyethylene terephthalate polyester and the at least one additive; and
(d) forming the article,
wherein the amount of the at least one polyethylene terephthalate polyester is in the range of 94.0 weight percent to 99.5 weight percent and the at least one additive is in the range of 0.5 weight percent to 6.0 weight percent, each based on the total weight of the article.

76. The process of claim 75, wherein the at least one polyethylene terephthalate polyester comprises:
(a) a dicarboxylic acid component comprising at least 90 mole percent of the residues of terephthalic acid and
(b) a hydroxyl component comprising at least 90 mole percent of the residues of ethylene glycol,
based on 100 mole percent of dicarboxylic acid component residues and 100 mole percent of hydroxyl component residues in the at least one polyethylene terephthalate polyester.

77. The process of claim 75, wherein the at least one polyethylene terephthalate polyester has an Intrinsic Viscosity (It.V.) in the range of 0.70 dL/g to 1.2 dL/g as measured at 25° C. in a 0.50 g polyester/100 mL of 60 wt. % phenol and 40 wt. % 1,1,2,2-tetrachloroethane solvent.

78. The process of claim 75, wherein the at least one additive is in an amount ranging from 0.5 weight percent to 2.5 weight percent.

79. The process of claim 75, wherein the polyester composition has an Intrinsic Viscosity (It.V.) in the range of 0.70 dL/g to 1.2 dL/g as measured at 25° C. in a 0.50 g polyester/100 mL of 60 wt. % phenol and 40 wt. % 1,1,2,2-tetrachloroethane solvent.

80. The process of claim 75, wherein the polyester composition has a $T_g$ of at least 77° C.

81. The process of claim 75, wherein polyester composition in the form of a 20 mil thick film has an L* greater than 85, a b* in the range of −1 to 2, and a haze value less than 4 percent.

82. The process of claim 75, wherein the at least one additive is fed to the extruder in the form of an additive concentrate.

83. The process of claim 75, wherein the at least one additive is chosen from one or more of isophthalamide, 2,6-naphthalenedicarboxamide, terephthalamide, N,N'-bis(phenylmethyl)-2,6-naphthalenedicarboxamide, N,N'-bis(phenylmethyl)-1,3-benzenedicarboxamide, N,N'-bis(phenylmethyl)-1,4-benzenedicarboxamide, N,N'-1,3-phenylenebisacetamide, N,N'-1,5-naphthalenediylbisacetamide, N,N'-1,3-phenylenebisbenzeneacetamide, and N,N'-1,5-naphthalenediylbisbenzeneacetamide.

84. The process of claim 83, wherein the at least one additive is chosen from one or more of isophthalamide, 2,6-naphthalenedicarboxamide, terephthalamide, N,N'-bis(phenylmethyl)-2,6-naphthalenedicarboxamide, N,N'-bis(phenylmethyl)-1,3-benzenedicarboxamide, and N,N'-bis(phenylmethyl)-1,4-benzenedicarboxamide.

85. The process of claim 83, wherein the at least one additive is chosen from one or more of N,N'-1,3-phenylenebisacetamide, N,N'-1,5-naphthalenediylbisacetamide, N,N'-1,3-phenylenebisbenzeneacetamide, and N,N'-1,5-naphthalenediylbisbenzeneacetamide.

86. The process of claim 75, further comprising adding one or more transition metal chosen from cobalt, manganese, nickel, copper, rhodium, and ruthenium.

87. The process of claim 86, wherein the transition metal comprises cobalt.

88. The process of claim 86, wherein the at least one polyethylene terephthalate and the at least one additive are premixed and fed to the extruder as one stream.

89. The process of claim 86, wherein the transition metal is fed to the extruder in the form of a transition metal concentrate.

* * * * *